United States Patent
Sahu et al.

(10) Patent No.: US 9,848,408 B2
(45) Date of Patent: Dec. 19, 2017

(54) PROACTIVE RANK INDEX MANAGEMENT IN SLTE ENABLED MODEM TO ACHIEVE HIGHER THROUGHPUT

(71) Applicant: QUALCOMM Incorporated, San Diego, CA (US)

(72) Inventors: Debesh Kumar Sahu, Hyderabad (IN); Venkata Siva Prasad Rao Gude, San Diego, CA (US); Venkata Girish Vadlamudi, Hyderabad (IN); Chintan Shirish Shah, San Diego, CA (US); Amit Mandil, Hyderababd (IN); Praveen Kumar Gottipati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/272,260

(22) Filed: May 7, 2014

(65) Prior Publication Data

US 2015/0131622 A1 May 14, 2015

Related U.S. Application Data

(60) Provisional application No. 61/903,320, filed on Nov. 12, 2013.

(51) Int. Cl.
*H04B 7/08* (2006.01)
*H04W 72/02* (2009.01)
(Continued)

(52) U.S. Cl.
CPC ............ *H04W 72/02* (2013.01); *H04B 7/063* (2013.01); *H04B 7/0693* (2013.01);
(Continued)

(58) Field of Classification Search
CPC .... H04W 72/02; H04W 88/06; H04B 7/0693; H04B 7/063; H04B 7/0877; H04B 7/0639; H04B 7/0632
See application file for complete search history.

(56) References Cited

U.S. PATENT DOCUMENTS 8,199,725 B2 * 6/2012 Yu .................... H04L 1/0027
370/334
8,369,290 B2 * 2/2013 Xing ................. H04K 3/226
370/334
(Continued)

FOREIGN PATENT DOCUMENTS

EP         2424125 A1    2/2012

OTHER PUBLICATIONS

4G Americas, "MIMO and Smart Antennas for Mobile Broadband Systems," 4G Americas MIMO and Smart Antennas for Mobile Systems, Oct. 2012, 138 pages, Retrieved from http://www.4gamericas.org/documents/MIMO%20and%20Smart%20Antennas%20for%20Mobile%20Broadband%20Systems%20Oct%202012x.pdf.
International Search Report and Written Opinion—PCT/US2014/063358—ISA/EPO—Jan. 1, 2015.

*Primary Examiner* — Andrew Lai
*Assistant Examiner* — Chuong M Nguyen
(74) *Attorney, Agent, or Firm* — Arent Fox, LLP

(57) ABSTRACT

A method, an apparatus, and a computer program product for wireless communication are provided. The apparatus may be a UE which uses a first antenna and a second antenna for communication with a first RAT. The apparatus determines that the second antenna is to be used for a procedure associated with a second RAT at a first time. The apparatus reduces a UE RI from an initial value to a reduced value for the communication with the first RAT at the first time based on the determination.

29 Claims, 15 Drawing Sheets

(51) Int. Cl.
*H04W 88/06* (2009.01)
*H04B 7/06* (2006.01)

(52) U.S. Cl.
CPC .......... *H04B 7/0877* (2013.01); *H04W 88/06* (2013.01); *H04B 7/0632* (2013.01); *H04B 7/0639* (2013.01)

(56) References Cited

U.S. PATENT DOCUMENTS

| | | |
|---|---|---|
| 8,514,721 B2 | 8/2013 | Luo et al. |
| 8,625,450 B2 | 1/2014 | Lunttila et al. |
| 8,811,421 B2* | 8/2014 | Su ................... H04W 76/026 370/465 |
| 2006/0030278 A1* | 2/2006 | Konaka ................ H04B 1/48 455/78 |
| 2008/0287075 A1* | 11/2008 | Kim ................... H04B 7/0671 455/101 |
| 2011/0243079 A1* | 10/2011 | Chen ................... H04B 7/063 370/329 |
| 2013/0288624 A1* | 10/2013 | Mujtaba ............ H04B 7/0817 455/140 |
| 2013/0310057 A1* | 11/2013 | Tabet ................ H04W 76/028 455/450 |
| 2013/0322303 A1 | 12/2013 | Manssour |
| 2013/0329594 A1* | 12/2013 | Davydov ............ H04B 7/0486 370/252 |
| 2015/0131568 A1* | 5/2015 | You .................... H04L 5/001 370/329 |

* cited by examiner

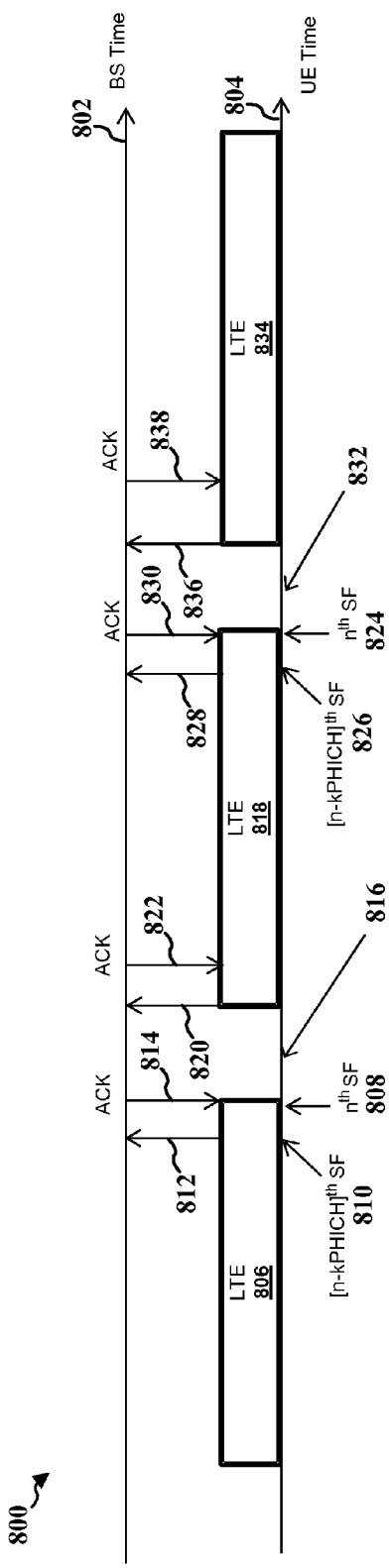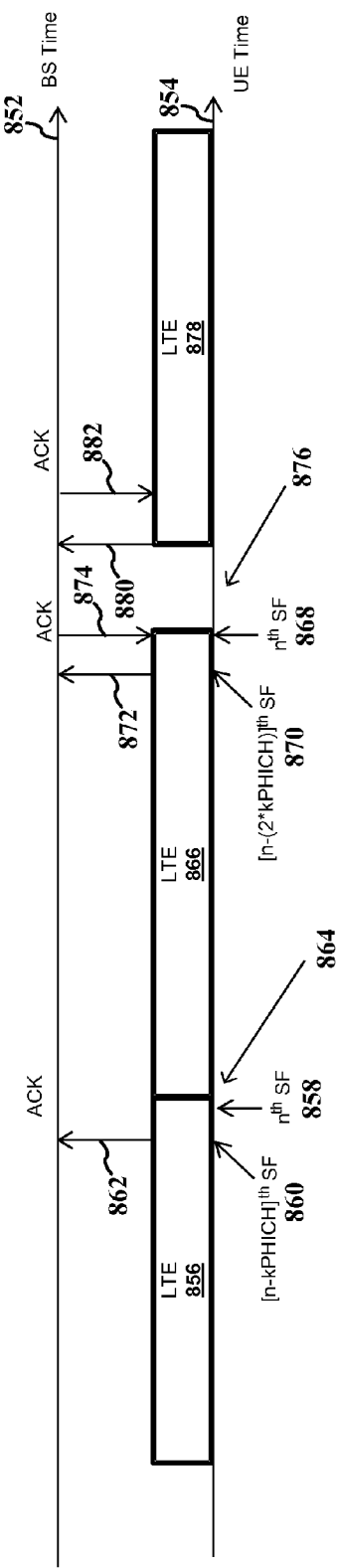

PROACTIVE RANK INDEX MANAGEMENT IN SLTE ENABLED MODEM TO ACHIEVE HIGHER THROUGHPUT

CROSS-REFERENCE TO RELATED APPLICATION(S)

This application claims the benefit of U.S. Provisional Application Ser. No. 61/903,320, entitled "PROACTIVE RI MANAGEMENT IN SLTE ENABLED MODEM TO ACHIEVE HIGHER THROUGHPUT" and filed on Nov. 12, 2013, which is expressly incorporated by reference herein in its entirety.

BACKGROUND

Field

The present disclosure relates generally to communication systems, and more particularly, to a tune away and a rank index management.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. In an aspect, the method is performed by a user equipment (UE) that uses a first antenna and a second antenna for communication with a first radio access technology (RAT). According to the method, the UE determines that the second antenna is to be used for a procedure associated with a second RAT at a first time, and reduces a UE rank index (RI) from an initial value to a reduced value for the communication with the first RAT at the first time based on the determination.

In another aspect, the apparatus may be a UE that uses a first antenna and a second antenna for communication with a first RAT. The apparatus includes a memory and at least one processor coupled to the memory. The at least one processor is configured to determine that the second antenna is to be used for a procedure associated with a second RAT at a first time, and to reduce a UE RI from an initial value to a reduced value for the communication with the first RAT at the first time based on the determination.

In another aspect, the apparatus includes means for determining that the second antenna is to be used for a procedure associated with a second RAT at a first time. The apparatus further includes means for reducing a UE RI from an initial value to a reduced value for the communication with the first RAT at the first time based on the determination.

In another aspect, a computer program product may be provided for a UE that uses a first antenna and a second antenna for communication with a first RAT. The computer program product includes a computer-readable medium comprising code for determining that the second antenna is to be used for a procedure associated with a second RAT at a first time, and reducing a UE RI from an initial value to a reduced value for the communication with the first RAT at the first time based on the determination.

BRIEF DESCRIPTION OF THE DRAWINGS

FIGS. 8A and 8B are example pictorial diagrams illustrating an embodiment according to the disclosure.

DETAILED DESCRIPTION

Figure 1:
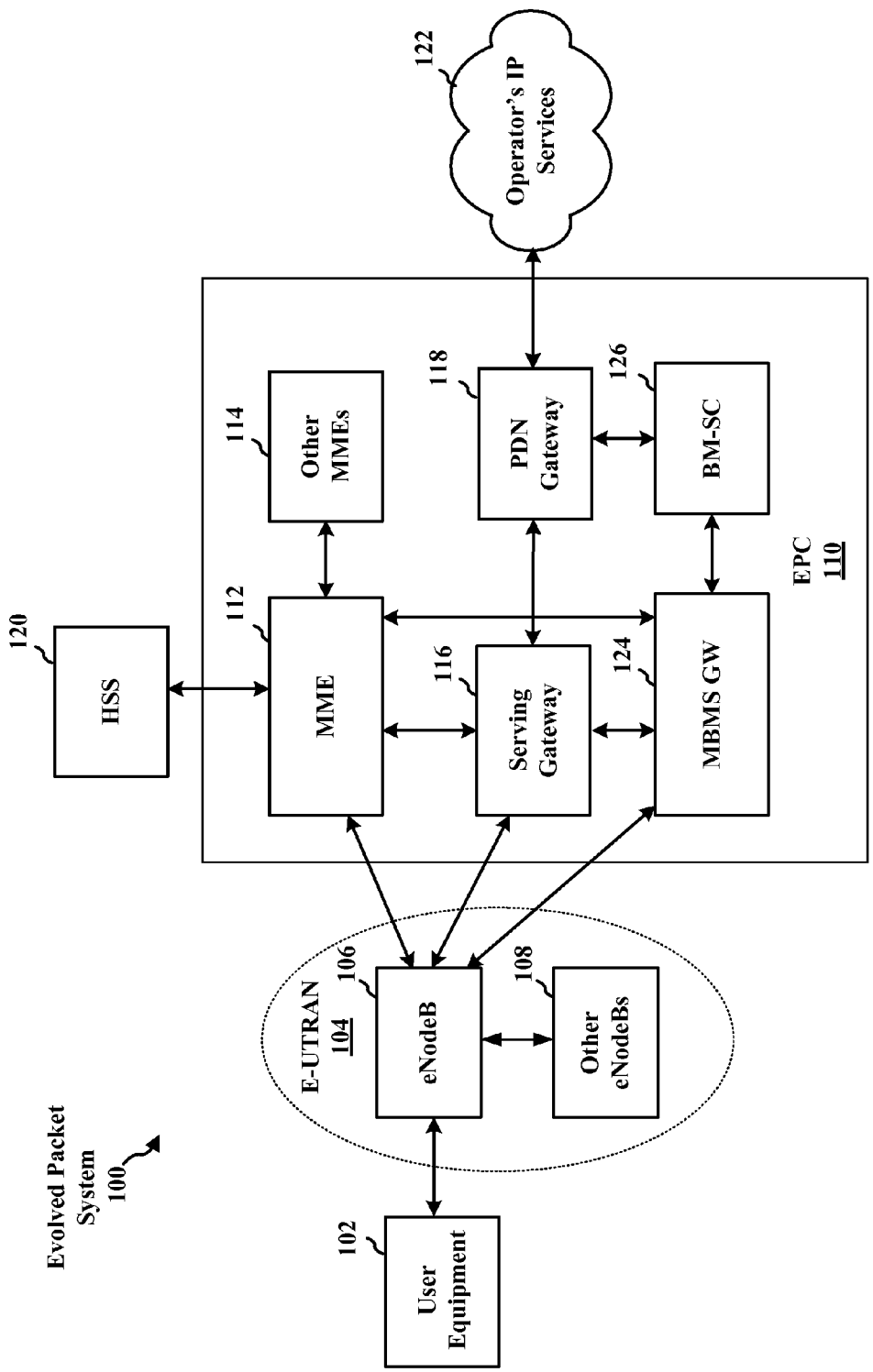
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
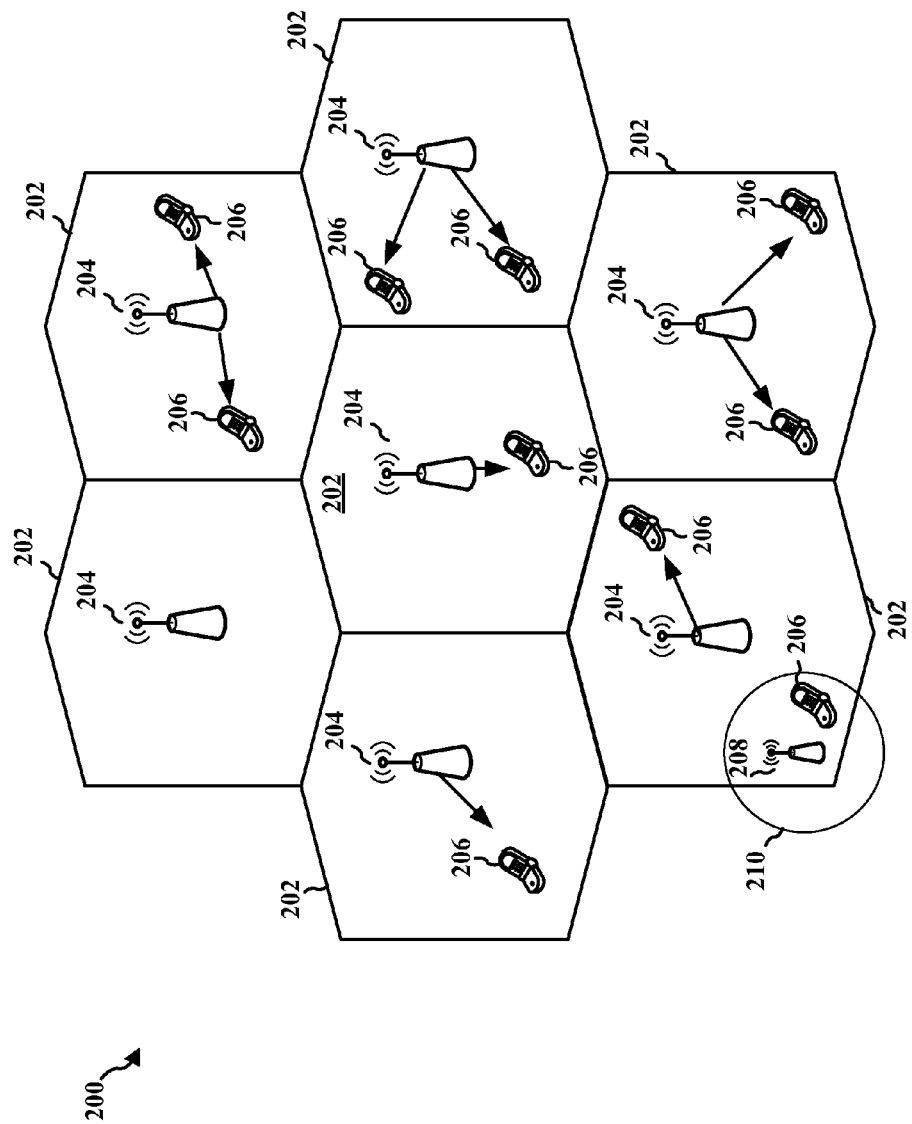
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
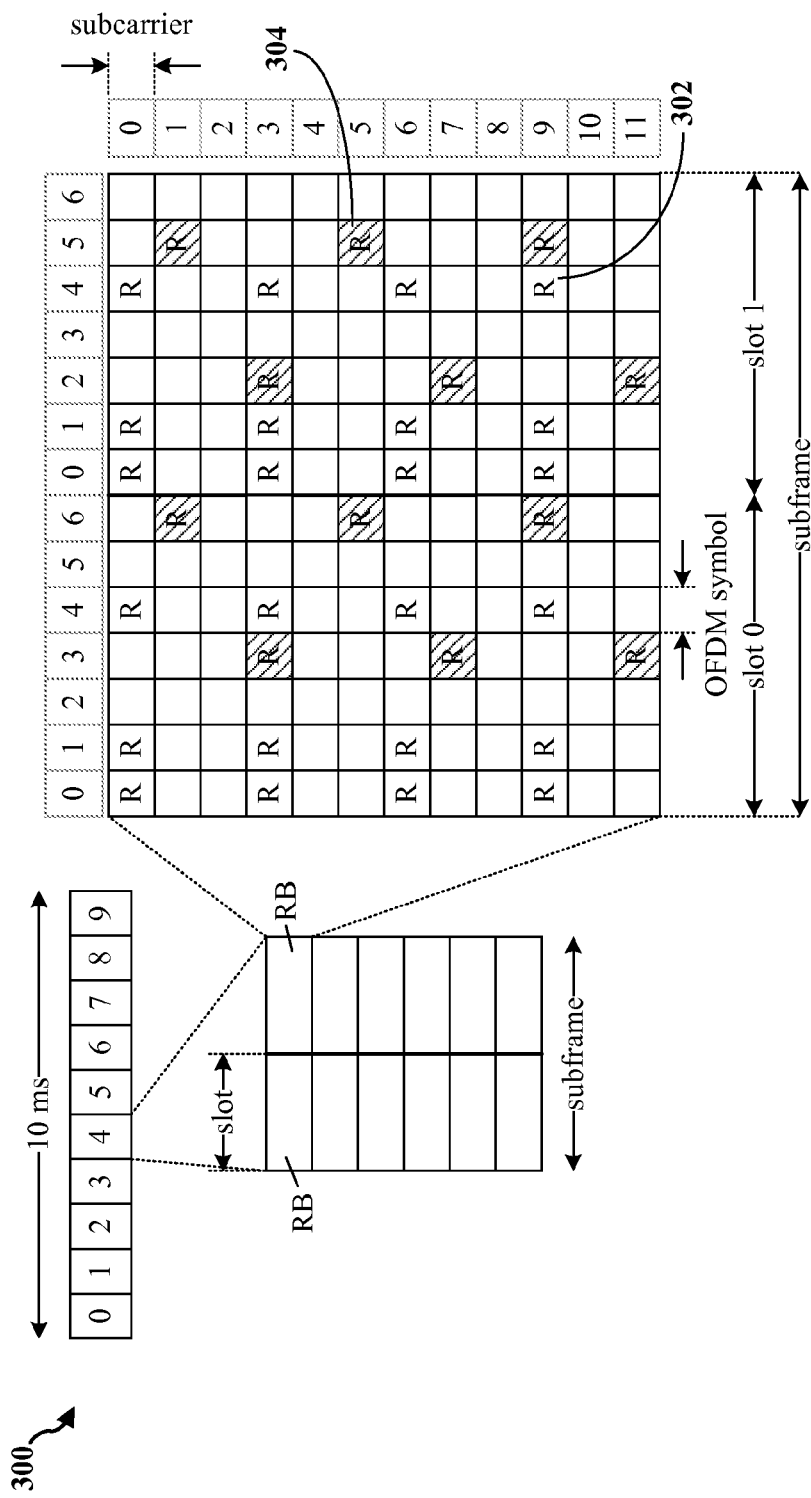
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
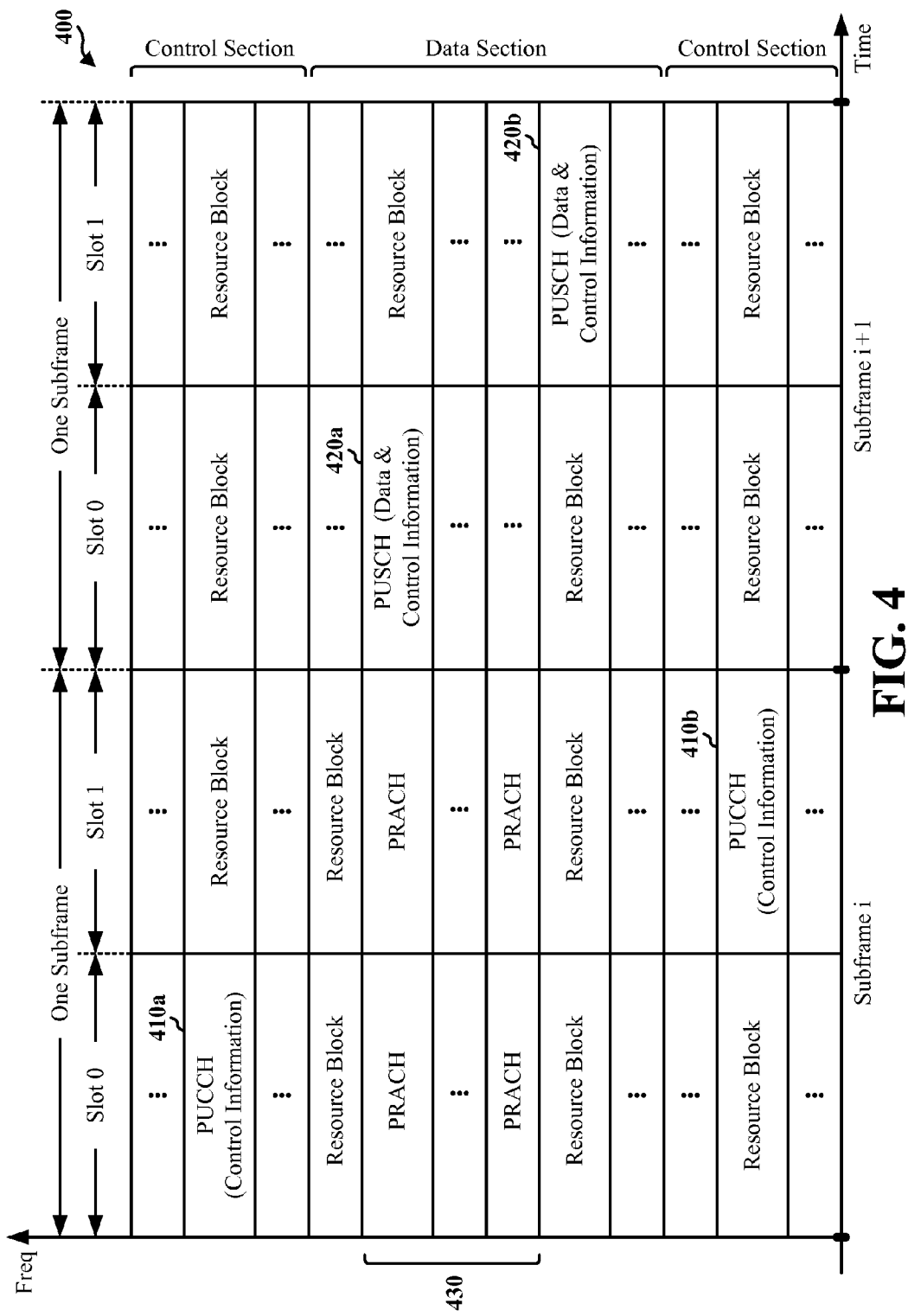
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
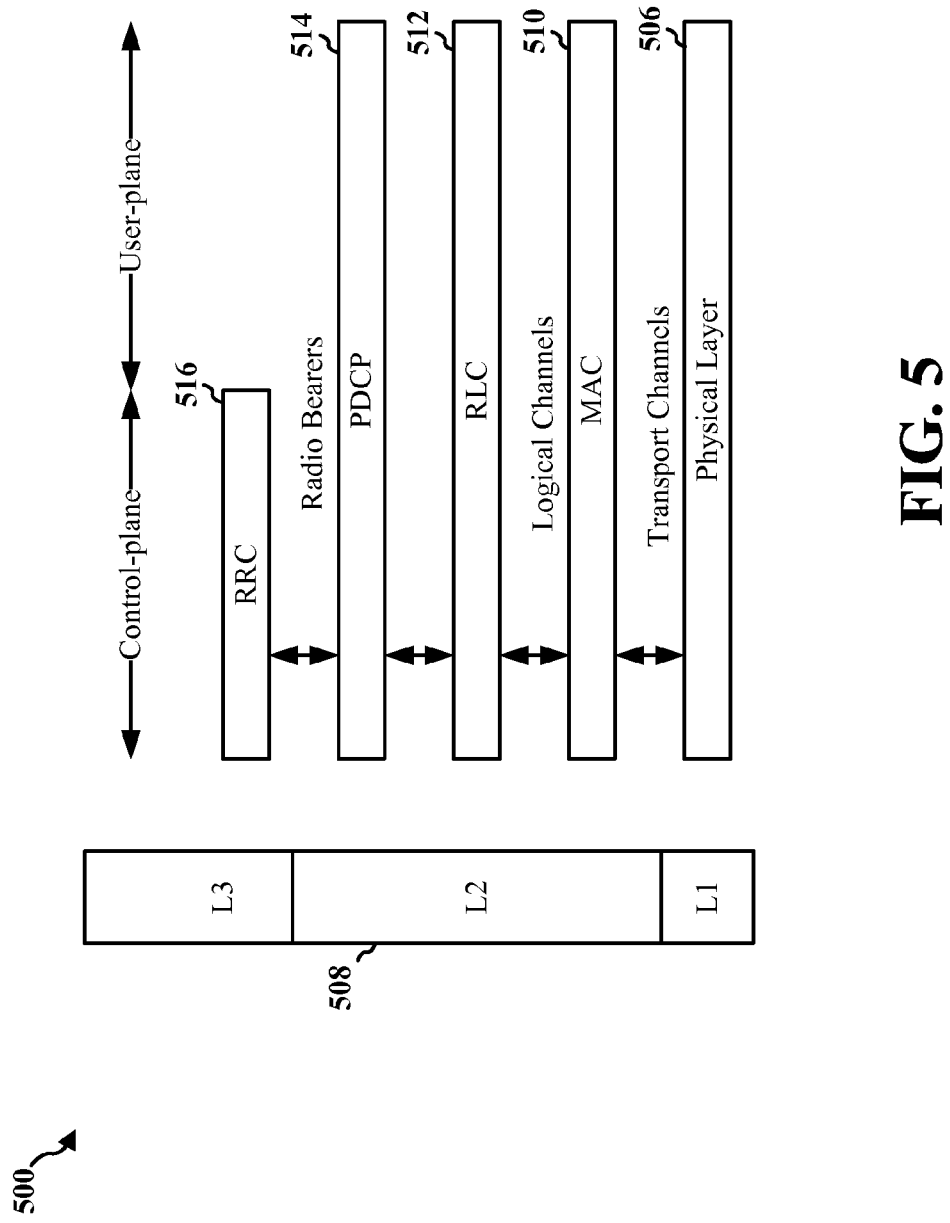
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
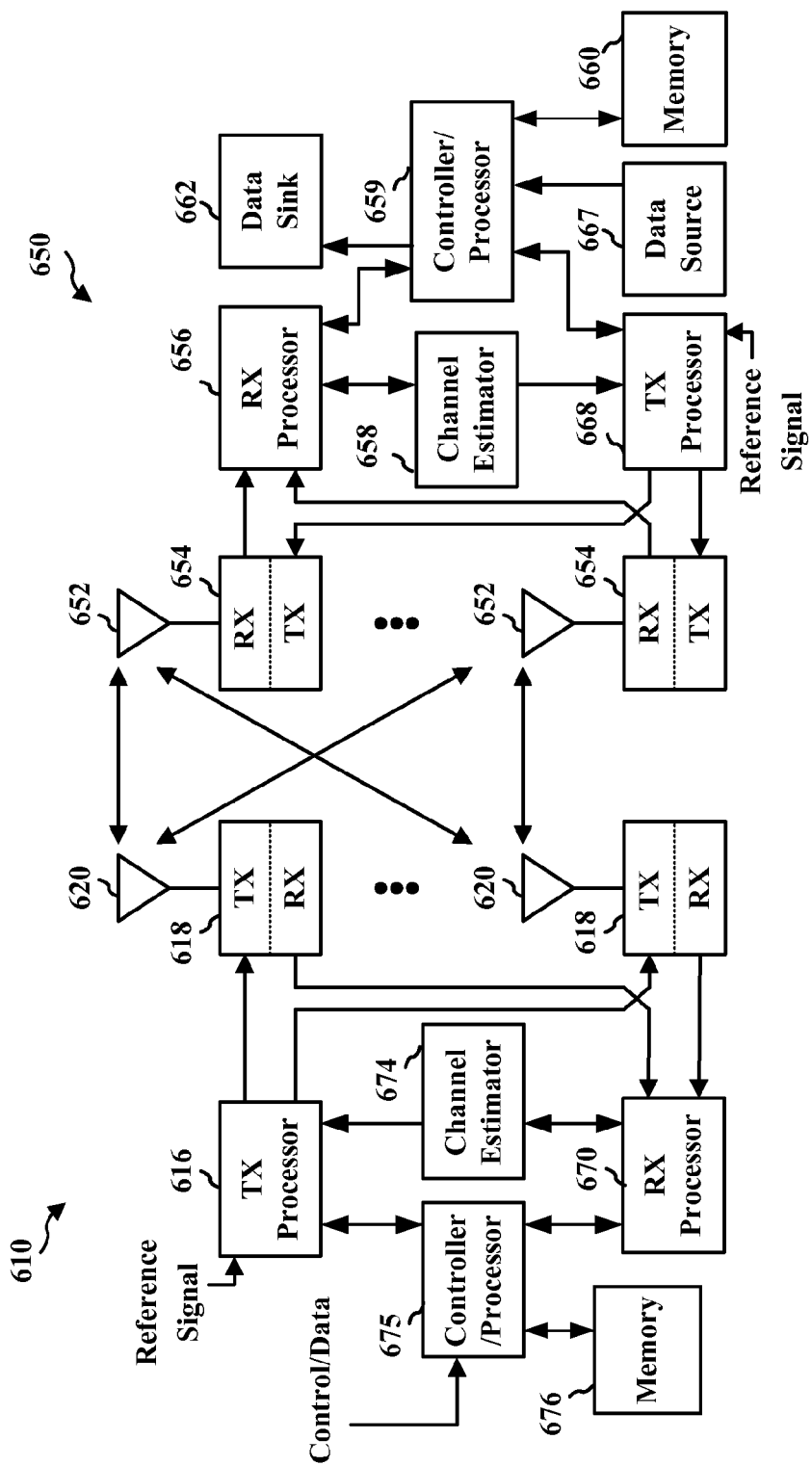
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Two or more different radio access technologies (RATs) may be operated in a single radio-frequency (RF) chain. Examples of RATs may include an LTE, GSM, CDMA, Wifi, etc. LTE and a second non-LTE RAT (e.g., GSM) may be operated in a single RF chain. Generally, if the UE uses the second RAT to monitor paging, use of LTE in the RF chain may be suspended in order to make the RF chain available for the second non-LTE RAT so that the UE can utilize the RF chain to tune to a proper frequency for the second non-LTE RAT. For example, in 1× Single Radio LTE (SRLTE) or gSRLTE designs, in order to monitor 1×/GSM pages, all RF resources that are initially assigned to LTE may be re-assigned to 1×/GSM. This causes the LTE stack to be suspended. The reassignment of the RF resources to monitor 1×/GSM pages causes LTE throughput degradation at the UE due to the sharing of the same RF chain among LTE and the non-LTE RAT such as GSM. However, with a simultaneous LTE (SLTE) design, a secondary chain (e.g., a diversity chain) may be utilized to demodulate a 1× quick paging channel/paging channel (QPCH/PCH) or a GSM broadcast control channel (BCCH) when LTE is in a connected state. To demodulate the 1×QPCH/PCH or the GSM BCCH, the UE may tune away its diversity receiver for the 1×QPCH/PCH or GSM for the duration of page demodulation for the 1×QPCH/PCH or GSM, and thus may experience disruption during the page demodulation.

Recent LTE designs may provide multiple antennas to support a DL MIMO functionality and to achieve higher data rates. For example, the UE may utilize a primary antenna and a secondary antenna for LTE. The UE may also utilize the primary antenna for LTE and utilize the secondary antenna for page monitoring by tuning away the secondary antenna from LTE to a non-LTE RAT. However, tuning away the secondary antenna for 1× page monitoring or GSM page monitoring may cause data throughput loss due to a high block error rate (BLER). Such data throughput loss is caused by the eNB continuing to communicate with the UE according to an initial configuration utilizing both the primary antenna and the secondary antenna for the LTE communication. For example, even if the MIMO functionality for LTE is not available at the UE due to the tune away of the secondary antenna, the eNB may still communicate with the UE based on the MIMO functionality because the eNB is not aware that the secondary antenna is tuned away, thereby causing data throughput degradation.

The above-stated problem may be addressed by informing the eNB of usage of the secondary antenna for a non-LTE RAT. Then, the secondary antenna may be relieved from the MIMO functionality while the secondary antenna is tuned away for communication with a non-LTE RAT such as 1×QPCH/PCH or GSM to monitor paging. For example, for the UE connected with LTE, when the UE is about to perform a tune away of the secondary antenna from LTE to another RAT, the UE can transmit a reduction request to the eNB and propose a reduced rank index (RI) of the UE. Once the eNB acknowledges the reduced UE RI in response to the reduction request, the UE may identify an Rx chain for the secondary antenna that is relieved from LTE and then perform a tune away to GSM or CDMA. The UE may further update a CQI and/or a PMI according to the reduced UE RI.

Figure 7:
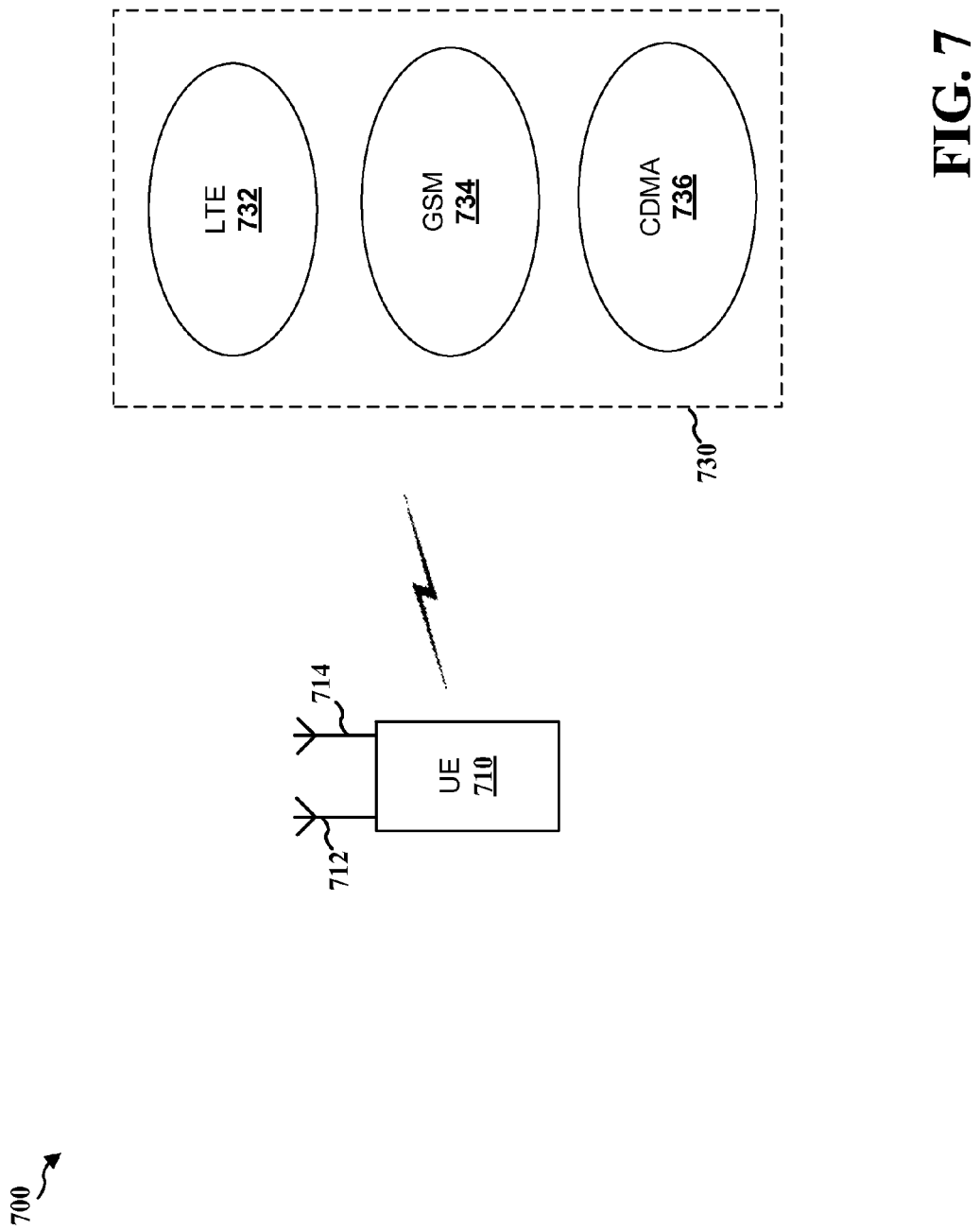
FIG. 7 is an example diagram illustrating a UE with two antennas interacting with various RATs according to one example embodiment.

FIG. 7 is an example diagram 700 illustrating a UE with two antennas interacting with various RATs according to one example embodiment. The UE 710 includes a primary antenna 712 and a secondary antenna 714. The UE 710 may include more antennas than the antennas shown in FIG. 7. The UE 710 may utilize at least one of the primary antenna 712 and the secondary antenna 714 to communicate with at least one of the RATs supported by the group of access networks 730 to connect to a network. The group of access networks 730 may include any number of access networks, such as but not limited to, an LTE network 732, a GSM network 734, and a CDMA network 736.

In an example implementation, the UE 710 identifies a tune away boundary for a non-LTE RAT (e.g., GSM, CDMA, etc.) to monitor pages associated with a non-LTE RAT, so as to determine the time when the UE 710 will tune away the secondary antenna 714 from LTE to a non-LTE RAT. For example, the UE 710 may identify a time 't' (or 'n$^{th}$' subframe) to perform the tune away. When the UE 710 identifies the tune away boundary, the UE 710 reduces a UE RI of the UE 710 (the UE RI) from an initial value to a reduced value and transmits a reduction request to an eNB of the LTE network 732 to propose the reduced UE RI to the eNB. For example, before performing the tune away, the UE 710 may reduce the UE RI value from UE RI=2 to UE RI=1, send the reduction request to the eNB for UE RI=1, and then wait for an acknowledgement from the eNB. In response to the reduction request, the eNB may transmit the acknowledgement of the reduction request to the UE 710. Once the eNB acknowledges the reduction request, the UE 710 and the eNB of the LTE network 732 may communicate with each other according to the reduced UE RI (UE RI=1 in this example). The UE 710 may additionally update a CQI and/or a PMI according to the reduced UE RI. For example, the UE 710 may update the CQI and/or the PMI if the CQI and/or the PMI are applicable to support the reduced UE RI or single layer transmission according to a specific standard (e.g., 3GPP 36.213).

The UE 710 may use an LTE physical layer (PHY) to transmit the reduction request at [n−kPHICH]$^{th}$ subframe, such that the tune away may be performed at $n^{th}$ subframe. For LTE TDD, kPHICH is determined based on Table 9.1.2-1 in 3GPP36.213 (see Table 1 below). For LTE FDD, kPHICH is equal to 4.

TABLE 1

$k_{PHICH}$ for TDD

| TDD Uplink-downlink Configuration | UL Subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | | | | | | | |
| 4 | | | 6 | | | | | | | |
| 5 | | | 6 | | | | | | | |
| 6 | | | 4 | 6 | 6 | | | 4 | 7 | |

If the UE 710 receives an acknowledgement of the reduction request, the UE 710 may perform the tune away of the secondary antenna 714 from the LTE network 732. In particular, if the UE 710 receives the acknowledgement at $n^{th}$ subframe, then the UE 710 can relieve the Rx chain for the secondary antenna 714 from the LTE network 732, such that the relieved Rx chain for the secondary antenna 714 may be utilized for a non-LTE RAT (e.g., GSM or CDMA). The UE 710 can subsequently perform the tune away to the GSM network 734 or the CDMA network 736 on the relieved Rx chain for the secondary antenna 714 and monitor the GSM paging via the GSM network 734 or the CDMA paging via the CDMA network 736. During the tune away period after the acknowledgement of the reduction request, the UE 710 performs communication with the LTE network 732 using the primary antenna 712 and without using the secondary antenna 714, because the secondary antenna 714 is used for a non-LTE network such as the GSM network 734 or the CDMA network 736. Further, during the tune away period, the UE 710 and the LTE network 732 may communicate with each other based on the reduced UE RI, without the MIMO functionality. After the tune away period is over, the Rx chain for the secondary antenna 714 is not utilized for a non-LTE RAT. Thus, after the tune away period is over, the UE 710 transmits a reversion request to the eNB of the LTE network 732 in order to propose reverting the reduced UE RI value back to the initial UE RI value. Upon receipt of an acknowledgement of the reversion request from the eNB, the UE 710 and the LTE network 732 may communicate with each other based on the initial value of the UE RI and use the MIMO functionality again, as both the primary antenna 712 and the secondary antenna 714 can be used for communication with the LTE network 732. A CQI and a PMI corresponding to the UE RI may also be updated based on the reversion back to the initial value of the UE RI.

If the UE 710 does not receive any acknowledgement of the reduction request, the UE 710 may skip the tune away, and may revert the UE RI back to the initial UE RI value. Thus, without the acknowledgment of the reduction request, the UE 710 and the LTE network 732 communicate with each other based on the initial value of the UE RI, and using both the primary antenna 712 and the secondary antenna 714. It is noted that the network may repeat pages, and thus even after skipping the current tune away, paging may be monitored at a next tune away period. Before the next tune away period, the UE 710 may again transmit a reduction request to the eNB in order to propose a reduced UE RI. For example, if the first tune away period is skipped, before the next tune away period starting at $n^{th}$ subframe, the UE 710 may use an LTE PHY to transmit the reduction request for the reduced UE RI at $[n-(2*kPHICH)]^{th}$ subframe and wait for the acknowledgement from the eNB. Thus, the reduction request for the next tune away period may be transmitted at an earlier subframe (e.g., $[n-(2*kPHICH)]^{th}$ subframe) than a subframe (e.g., $[n-kPHICH]^{th}$ subframe) at which the reduction request is previously transmitted. Transmitting the reduction request for the next tune away at the earlier subframe will allow more time to receive the acknowledgment of the reduction request from the eNB, thus allowing more opportunities to successfully receive the acknowledgement of the reduction request. If the UE 710 receives the acknowledgement of the reduction request before $n^{th}$ subframe, then the UE 710 can relieve the Rx chain for the secondary antenna 714 from the LTE network 732, such that the relieved Rx chain may be utilized for a non-LTE RAT. If the UE 710 does not receive any acknowledgement of the reduction request for the next tune away and thus fails to receive any acknowledgement of the reduction request for the second time, the UE 710 may perform the tune away, regardless of whether the UE 710 has received the acknowledgement or not.

During the next tune away, the UE 710 performs communication with the LTE network 732 using the primary antenna 712 and without using the secondary antenna 714. After the next tune away period is over, the UE 710 transmits a reversion request to the eNB of the LTE network 732 in order to propose changing the reduced UE RI value back to the initial value of the UE RI. When the eNB acknowledges the reversion request, the UE 710 and the LTE network 732 may use the MIMO functionality again with both the primary antenna 712 and the secondary antenna 714 for communication with the LTE network 732. A CQI and a PMI corresponding to the UE RI may also be updated based on the reversion back to the initial value of the UE RI.

FIGS. 8A and 8B are example pictorial diagrams illustrating an embodiment according to the disclosure. FIG. 8A is a diagram 800 illustrating a first case where acknowledgements of reduction requests are successfully received. FIG. 8A illustrates a base station (e.g., an eNB of an LTE network) time line 802 and a UE time line 804. During a first LTE period 806, the UE performs an LTE session based on an initial value of the UE RI. If the UE identifies that a tune away to GSM will be performed at $n^{th}$ subframe 808, the UE transmits at $[n-kPHICH]^{th}$ subframe 810 a reduction request 812 to reduce the UE RI to the eNB. The reduction request 812 may be transmitted to the eNB via a PUSCH or a PUCCH. In response to the reduction request 812, the eNB transmits an acknowledgement 814, which is received by the UE at $n^{th}$ subframe 808. Upon receipt of the acknowledgement 814 of the reduction request 812, the UE relieves one of the RF Rx chains and performs a first tune away session 816 using the relieved RF Rx chain to tune away from LTE to a non-LTE RAT. For example, during the first tune away session 816, the UE may tune away an RF RX chain for the secondary antenna to GSM or CDMA to monitor paging. Further, during the first tune away session 816, the UE and the eNB communicate with each other based on the reduced UE RI. After the first tune away session 816 is over, the UE performs another LTE session during a second LTE period 818. At the beginning of the second LTE period 818, the UE transmits a reversion request 820 to revert the reduced UE RI back to the initial value of the UE RI. The reversion request 820 may be transmitted via a PUSCH or a PUCCH. In response to the reversion request 820, the eNB transmits an acknowledgement 822, which is received by the UE.

Upon the acknowledgement 822 of the reversion request 820 from the eNB, the UE performs the LTE session with the eNB based on the initial value of the UE RI and is able to utilize the MIMO functionality.

During a second LTE period 818, if the UE identifies that a tune away to GSM will be performed at $n^{th}$ subframe 824, the UE transmits to the eNB at $[n-kPHICH]^{th}$ subframe 826 a reduction request 828 to reduce the UE RI. In response to the reduction request 828, the eNB transmits an acknowledgement 830, which is received by the UE at $n^{th}$ subframe 824. Upon receiving the acknowledgement 830 of the reduction request 828 to reduce the UE RI, the UE relieves one of the RF Rx chains and performs a second tune away session 832 using the relieved RF Rx chain. Further, during the second tune away session 832, the UE and the eNB communicate with each other based on the reduced UE RI. After the second tune away session 832 is over, the UE performs another LTE session during the third LTE period 834. At the beginning of the third LTE period 834, the UE transmits a reversion request 836 to revert the reduced UE RI back to the initial value of the UE RI. The reversion request 836 may be transmitted via a PUSCH or a PUCCH. In response to the reversion request 836, the eNB transmits an acknowledgement 838, which is received by the UE. Upon receiving the acknowledgement 838 of the reversion request 836, the UE performs the LTE session with the eNB based on the initial value of the UE RI and is able to utilize the MIMO functionality.

FIG. 8B is a diagram 850 illustrating a second case where an acknowledgement of a reduction request is not received. FIG. 8B illustrates a base station (e.g., the eNB) time line 852 and a UE time line 854. During a first LTE period 856, the UE performs an LTE session based on an initial value of the UE RI. If the UE identifies that a tune away to GSM will be performed at $n^{th}$ subframe 858, the UE transmits to the eNB at $[n-kPHICH]^{th}$ subframe 860 a reduction request 862 to reduce the UE RI. The reduction request 862 may be transmitted via a PUSCH or a PUCCH. However, in the second case, the UE does not receive an acknowledgement from the eNB in response to the reduction request 862. Thus, the UE does not perform the tune away at time point 864, but instead proceeds to a second LTE period 866, without using the reduced UE RI for an LTE communication.

After the UE fails to receive the acknowledgement of the reduction request 862 during the first LTE period 856, during a second LTE period 866, if the UE identifies that a tune away to GSM will be performed at $n^{th}$ subframe 868, the UE transmits at $[n-(2*kPHICH)]^{th}$ subframe 870 a reduction request 872 to reduce the UE RI to the eNB. Thus, the UE transmits the reduction request 872 to the eNB at an earlier subframe than a subframe at which the reduction request 862 is previously transmitted. Because the UE transmits the reduction request 872 at an earlier subframe during the second LTE period 866, the UE has more opportunities to successfully receive an acknowledgement from the eNB during the second LTE period 866 than during the first LTE period 856. The reduction request 872 may be transmitted via a PUSCH or a PUCCH. In response to the reduction request 872, the eNB transmits an acknowledgement 874, which is received by the UE at $n^{th}$ subframe 868. Upon receiving the acknowledgement 874 of the reduction request 872 to reduce the UE RI, the UE relieves one of the RF chains and performs a first tune away session 876 using the relieved RF chain. In one embodiment, even if the UE does not receive the acknowledgment 874, the UE may still perform the first tune away session 876 if the UE has previously sent a reduction request a predetermined number of times (e.g., twice) but did not receive an acknowledgement of the reduction request. Further, during the first tune away session 876, the UE and the eNB communicate with each other based on the reduced UE RI. After the first tune away session 876 is over, the UE performs another LTE session during the third LTE period 878. At the beginning of the third LTE period 878, the UE transmits a reversion request 880 to revert the reduced UE RI back to the initial value of the UE RI. The reversion request 880 may be transmitted via PUSCH or PUCCH. In response to the reversion request 880, the eNB transmits an acknowledgement 882, which is received by the UE. Upon receiving the acknowledgement 882, the UE performs the LTE session with the eNB based on the initial value of the UE RI and is able to utilize the MIMO functionality.

Figure 9:
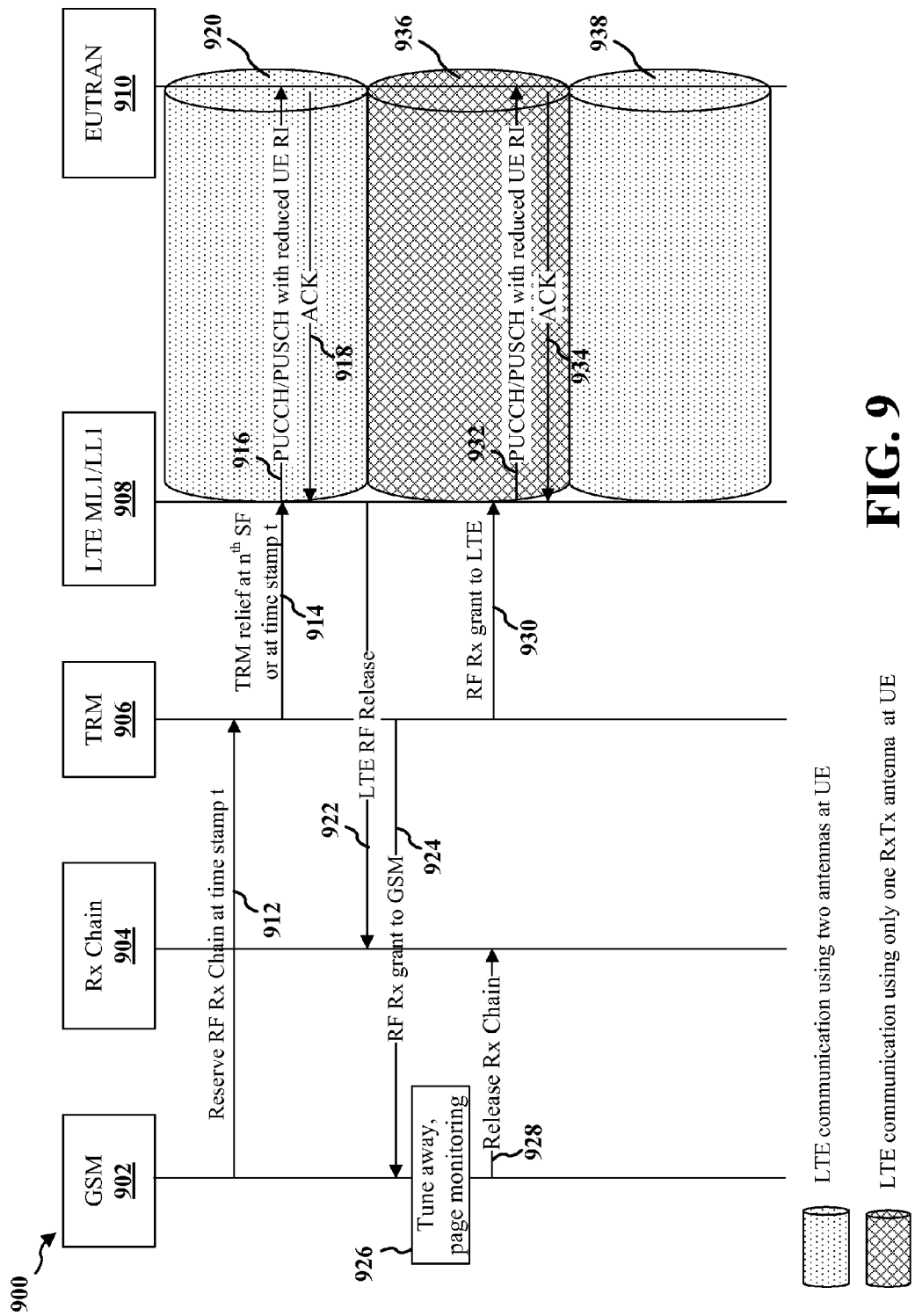
FIG. 9 is a flow diagram illustrating a tune away process according to an example embodiment.

FIG. 9 is a flow diagram 900 illustrating a tune away process according to an example embodiment. The flow diagram 900 includes a GSM module 902, an RX chain 904, a time reversal mirror (TRM) module 906, an LTE ML1/LL1 module 908, and an EUTRAN 910. The UE may include the GSM module 902, the RX chain 904, the TRM module 906, and the LTE ML1/LL1 module 908. The EUTRAN 910 may include an eNB of an LTE network, as illustrated in FIG. 1. At step 912, the GSM module 902 sends a message to the TRM module 906 to reserve an RF Rx chain at timestamp t. In response, at step 914, the TRM module 906 sends a signal to the LTE ML1/LL1 module 908 to relieve the RF Rx chain at $n^{th}$ subframe that corresponds to timestamp t. In order to relieve the RF Rx chain at $n^{th}$ subframe, at step 916, the LTE ML1/LL1 module 908 transmits a reduction request to reduce the UE RI to the EUTRAN 910 via a PUCCH or a PUSCH before the $n^{th}$ subframe. For example, the reduction request may be sent to the EUTRAN 910 at $[n-kPHICH]^{th}$ subframe. In response, at step 918, the EUTRAN may send an acknowledgement of the reduction request to the LTE ML1/LL1 module 908. Steps 912-918 take place during a first LTE period 920, where both a primary antenna and a secondary antenna of the UE are used for LTE communication based on an initial value of the UE RI.

Upon receipt of the acknowledgment of the reduction request, at step 922, the LTE ML1/LL1 module 908 sends a signal to the Rx Chain 904 to release the Rx chain for the secondary antenna from LTE. Subsequently, at step 924, the TRM module 906 provides a grant to utilize GSM on the Rx Chain 904. In response, at step 926, the GSM module 902 performs a tune away of the secondary antenna from LTE in order to use the Rx Chain 904 for page monitoring in GSM. After the tune away is finished, at step 928, the GSM module 902 transmits a signal to the Rx Chain 904 to release the RX Chain 904 from GSM. Subsequently, at step 930, the TRM module 906 provides a grant to the LTE ML1/LL1 module 908 in order to utilize LTE on the RX chain 904. Then, at step 932, the LTE ML1/LL1 module 908 transmits a reversion request to revert the RI back to the initial value of the UE RI to the EUTRAN 910 via a PUCCH or a PUSCH. In response, at step 934, the EUTRAN 910 sends an acknowledgement of the reversion request to the LTE ML1/LL1 module 908. Steps 924-934 take place during a tune away session 936 where only the primary antenna of the UE is used for the LTE communication based on the reduced UE RI and the secondary antenna of the UE is relieved from the LTE communication to be available for the tune away. After the tune away session 936, a second LTE session 938 may take place using both the primary antenna and the secondary antenna for the LTE communication, based on the initial value of the UE RI.

Figure 10A:
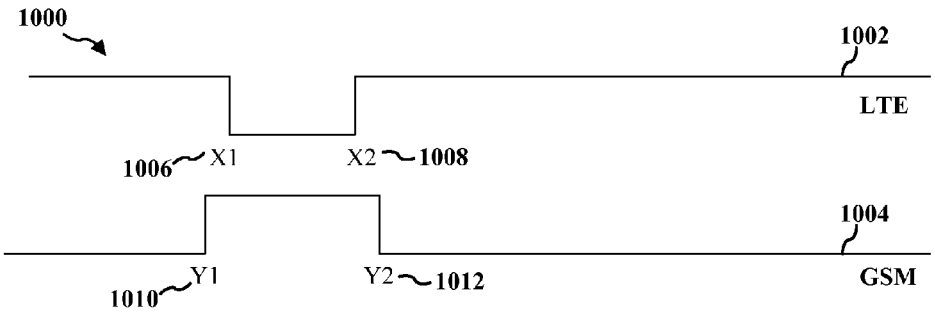
FIGS. 10A-10D are example diagrams illustrating various scenarios of an LTE sleep duration and a GSM activation duration for an RF Rx chain

FIGS. 10A-10D are example diagrams illustrating various scenarios of an LTE sleep duration and a GSM activation duration for an RF Rx chain. It is noted that the UE may perform the tune away of the RF Rx chain during the GSM activation duration. FIG. 10A is a diagram 1000 illustrating a first scenario of the LTE sleep duration and the GSM activation duration. FIG. 10A includes an LTE time line 1002 and a GSM time line 1004. The LTE communication becomes inactive during the LTE sleep duration (e.g., a connected mode discontinuous reception (cDRX) period) between time X1 1006 and time X2 1008. Before X1 1006, the UE performs the LTE communication based on an initial value of the UE RI. The GSM communication becomes active during the activation duration between time Y1 1010 and time Y2 1012, and is inactive during the inactivation duration (e.g., a discontinuous reception (DRX) period) before Y1 1010 and after Y2 1012. In the first scenario, Y1<X1<X2<Y2, and thus both LTE and GSM are active between Y1 1010 and X1 1006 and between X2 1008 and Y2 1012. Because Y1 1010 occurs before X1 1006, the UE informs a reduced UE RI (and corresponding CQI and PMI) to the eNB at Y1-kPHICH$^{th}$ subframe. Further, because GSM becomes inactive at Y2 1012, which occurs after X2 1008, the UE informs the initial value of the UE RI (and corresponding CQI and PMI) to the eNB at Y2 1012.

Figure 10B:
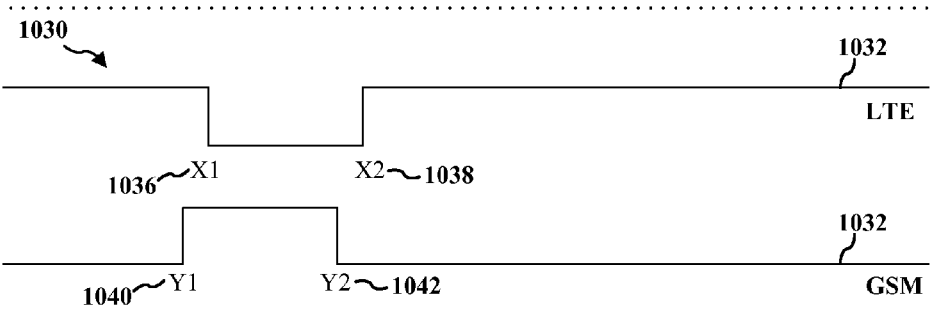

FIG. 10B is a diagram 1030 illustrating a second scenario of the LTE sleep duration and the GSM activation duration. FIG. 10B includes an LTE time line 1032 and a GSM time line 1034. The LTE communication becomes inactive during the LTE sleep duration between time X1 1036 and time X2 1038. Before X1 1036, the UE performs the LTE communication based on an initial value of the UE RI. The GSM communication becomes active during the activation duration between time Y1 1040 and time Y2 1042, and is inactive during the inactivation duration before Y1 1040 and after Y2 1042. In the first scenario, Y1<X1<Y2<X2, and thus both LTE and GSM are active between Y1 1040 and X1 1036. Because Y1 1040 occurs before X1 1036, the UE informs a reduced UE RI (and corresponding CQI and PMI) to the eNB at Y1-kPHICH$^{th}$ subframe. Further, because LTE becomes active at X2 1038, which occurs after Y2 1042, the UE informs the initial value of the UE RI (and corresponding CQI and PMI) to the eNB at X2 1038.

Figure 10C:
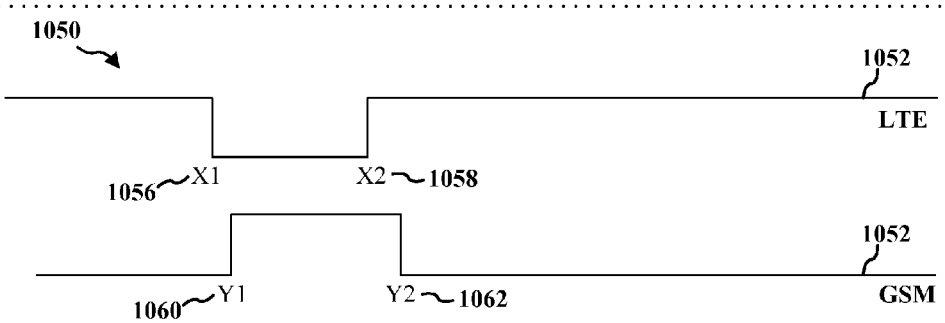

FIG. 10C is a diagram 1050 illustrating a third scenario of the LTE sleep duration and the GSM activation duration. FIG. 10C includes an LTE time line 1052 and a GSM time line 1054. The LTE communication becomes inactive during the LTE sleep duration between time X1 1056 and time X2 1058. Before X1 1056, the UE performs the LTE communication based on an initial value of the UE RI. The GSM communication becomes active during the activation duration between time Y1 1060 and time Y2 1062. In the first scenario, X1<Y1<X2<Y2, and thus both LTE and GSM are active between X2 1058 and Y2 1062. Because X1 1056 occurs before Y1 1060, the UE informs a reduced UE RI (and corresponding CQI and PMI) to the eNB at X1-kPHICH$^{th}$ subframe. Further, because Y2 1062 occurs after X2 1058, UE informs the initial value of the UE RI (and corresponding CQI and PMI) to eNB at Y2 1062.

Figure 10D:
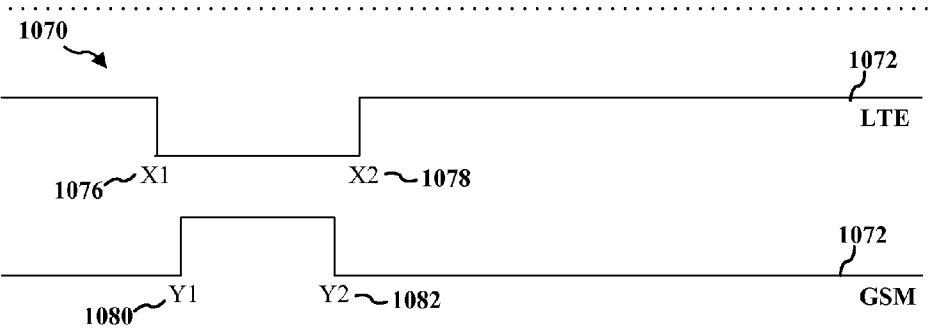

FIG. 10D is a diagram 1070 illustrating a third scenario of the LTE sleep duration and the GSM activation duration. FIG. 10D includes an LTE time line 1072 and a GSM time line 1074. The LTE communication becomes inactive during the LTE sleep duration between time X1 1076 and time X2 1078. Before X1 1076, the UE performs the LTE communication based on an initial value of the UE RI. The GSM communication becomes active during the activation duration between time Y1 1080 and time Y2 1082. In the fourth scenario, X1<Y1<Y2<X2, there is no instance where both LTE and GSM are active. Thus, in the fourth scenario, because there is no overlap between the LTE activation duration and the GSM activation duration, the UE informs a reduced UE RI (and corresponding CQI and PMI) to the eNB at X1-kPHICH$^{th}$ subframe and informs the initial value of the UE RI (and corresponding CQI and PMI) to the eNB at X2.

Figure 11:
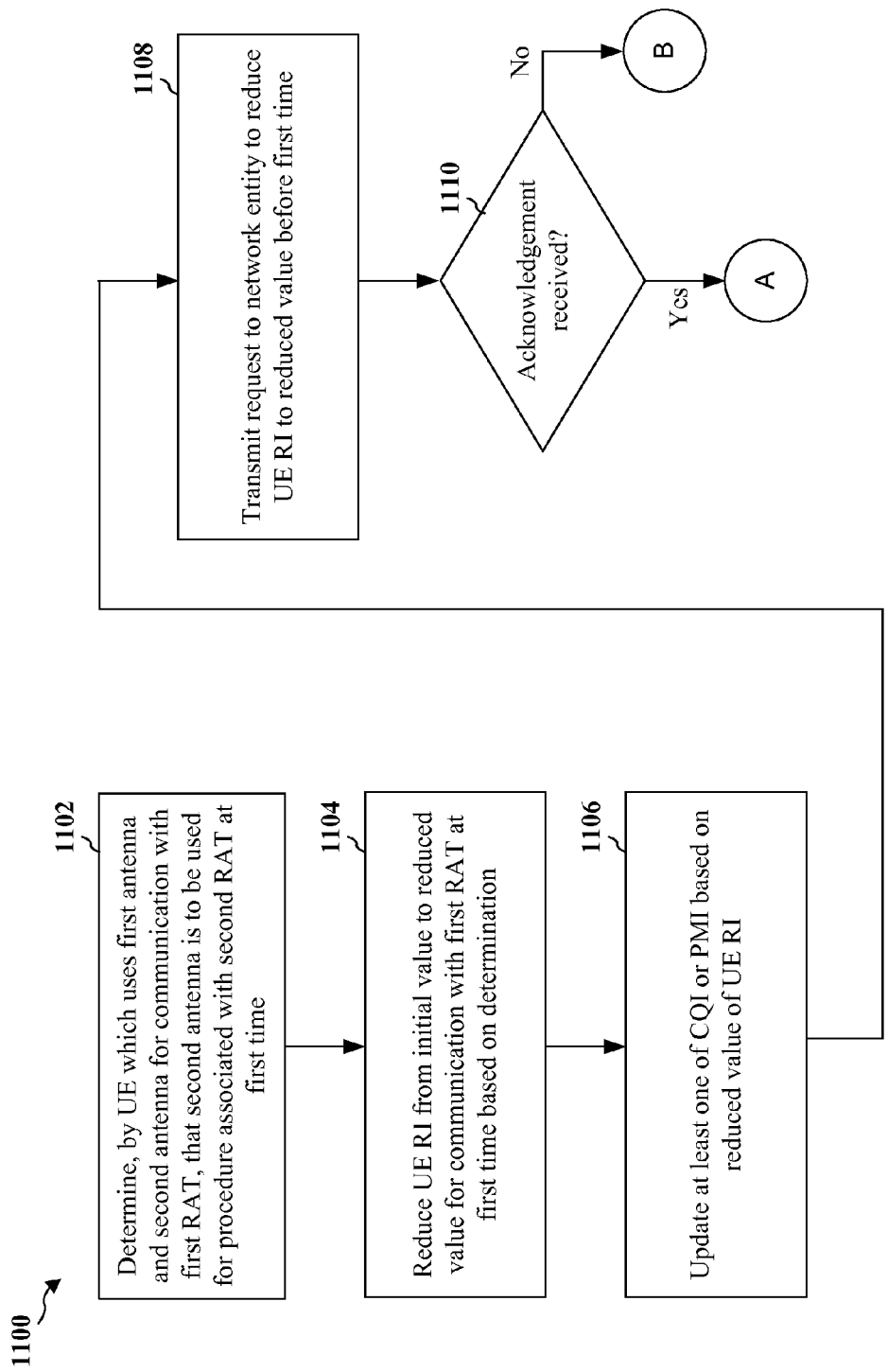
FIG. 11 is a flow chart of a method of wireless communication.

FIG. 11 is a flow chart 1100 of a method of wireless communication. The method may be performed by a UE (e.g., UE 710, apparatus 1402/1402'). At step 1102, the UE that uses a first antenna (e.g., primary antenna 712) and a second antenna (e.g., secondary antenna 714) for communication with a first RAT determines that the second antenna is to be used for a procedure associated with a second RAT at a first time. In an aspect, the determination may be performed by at least one of antenna determination module 1404, processor 1504, etc. At step 1104, the UE reduces a UE RI from an initial value to a reduced value for the communication with the first RAT at the first time based on the determination. In an aspect, the reduction may be performed by at least one of first RAT processing module 1406, second RAT processing module 1410, processor 1504, etc. At step 1106, the UE updates at least one of a CQI or a PMI based on the reduced value of the UE RI. In an aspect, the updating may be performed by at least one of first RAT processing module 1406, processor 1504, etc. At step 1108, the UE transmits a request to a network entity to reduce the UE RI to the reduced value before the first time. In an aspect, the transmission may be performed by at least one of transmission module 1408, processor 1504, etc. The UE may transmit the request to the network entity before the first time when the procedure associated with the second RAT begins before a start of a sleep time associated with the first RAT and overlaps at least in part with the sleep time associated with the first RAT, or may transmit the request to the network entity before a start of a sleep time associated with the first RAT when the procedure associated with the second RAT begins after the start of the sleep time associated with the first RAT and overlaps at least in part with the sleep time associated with the first RAT. At step 1110, the UE determines whether the UE receives an acknowledgement in response to the transmission of the request to reduce the UE RI. In an aspect, the determination may be performed by at least one of reception module 1412, antenna determination module 1404, processor 1504, etc. If the UE receives the acknowledgement in response to the transmission, then the UE proceeds to A, which is further described in FIG. 12. If the UE does not receive the acknowledgement in response to the transmission, then the UE proceeds to B, which is further described in FIG. 13. As discussed supra in FIG. 7, the UE 710 may include the primary antenna 712 and the secondary antenna 714. When the UE 710 identifies the tune away boundary for a non-LTE RAT (e.g., GSM or CDMA), the UE 710 reduces a UE RI of the UE 710 (the UE RI) from an initial value to a reduced value and transmits a reduction request to an eNB of the LTE network 732 to propose the reduced UE RI to the eNB. The UE 710 may use an LTE PHY to transmit the reduction request at [n-kPHICH]$^{th}$ subframe, such that the tune away may be performed at n$^{th}$ subframe. Further, as discussed supra, referring to FIGS. 10A-10B, if Y1 1010 occurs before X1 1006, the UE informs a reduced UE RI (and corresponding CQI and PMI) to the eNB at Y1-kPHICH$^{th}$ subframe. Referring to FIG. 10C, if X1 1056 occurs before Y1 1060, the UE informs a reduced UE RI (and corresponding CQI and PMI) to the eNB at X1−kPHICH$^{th}$ subframe. After transmitting the reduction request to the eNB, the UE 710 waits for an acknowledgement of the reduction request from the eNB.

Figure 12:
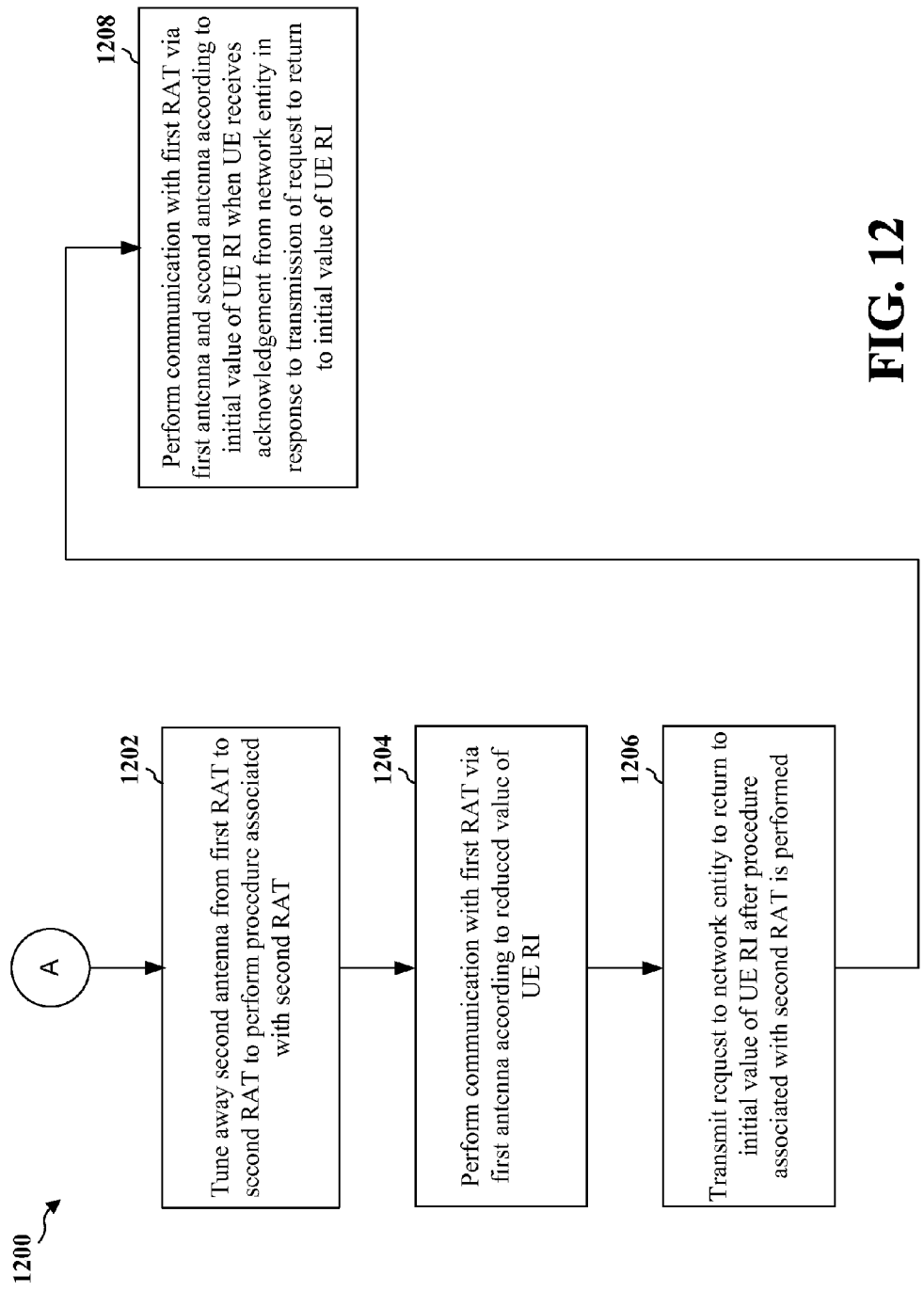
FIG. 12 is a flow chart of a method of wireless communication continuing from FIG. 11.

FIG. 12 is a flow chart 1200 of a method of wireless communication continuing from FIG. 11. In particular, the flow chart 1200 continues from the flow chart 1100 of FIG. 11 if the UE receives the acknowledgement in response to the transmission of the request to reduce the UE RI. At step 1202, the UE tunes away the second antenna from the first RAT to the second RAT to perform the procedure associated with the second RAT. In an aspect, the tune away may be performed by at least one of antenna determination module 1404, first RAT processing module 1406, second RAT processing module 1410, transmission module 1408, processor 1504, etc. At step 1204, the UE performs communication with the first RAT via the first antenna according to the reduced value of the UE RI. In an aspect, the communications may be performed by at least one of reception module 1412, transmission module 1408, processor 1504, etc. As discussed supra, if the UE 710 of FIG. 7 receives the acknowledgement of the reduction request, then the UE 710 can relieve the Rx chain for the secondary antenna 714 from the LTE network 732, such that the relieved Rx chain for the secondary antenna 714 may be utilized for a non-LTE RAT (e.g., GSM or CDMA). Further, as discussed supra, during the tune away period after the acknowledgement of the reduction request, the UE 710 performs communication with the LTE network 732 using the primary antenna 712 and without using the secondary antenna 714.

At step 1206, the UE transmits a request to the network entity to return to the initial value of the UE RI after the procedure associated with the second RAT is performed. In an aspect, the transmission may be performed by at least one of transmission module 1408, processor 1504, etc. The UE may transmit the request to the network entity to return to the initial value of the UE RI at a later one of a time at which a sleep time associated with the first RAT ends and a time at which performance of the procedure associated with the second RAT ends. At step 1208, the UE performs communication with the first RAT via the first antenna and the second antenna according to the initial value of the UE RI when the UE receives an acknowledgement from the network entity in response to the transmission of the request to return to the initial value of the UE RI. In an aspect, the communications may be performed by at least one of reception module 1412, transmission module 1408, processor 1504, etc. As discussed supra, after the tune away period is over, the UE 710 transmits a reversion request to the eNB of the LTE network 732 in order to propose reverting the reduced UE RI value back to the initial UE RI value. Upon receipt of an acknowledgement of the reversion request, the UE 710 and the LTE network 732 may communicate with each other based on the initial value of the UE RI and use the MIMO functionality again as both the primary antenna 712 and the secondary antenna 714 can be used for communication with the LTE network 732. Further, as discussed supra, referring to FIG. 10A, if GSM becomes inactive at Y2 1012, which occurs after X2 1008, UE informs the initial value of the UE RI (and corresponding CQI and PMI) to eNB at Y2 1012. Referring to FIG. 10B, if LTE becomes active at X2 1038, which occurs after Y2 1042, the UE informs the initial value of the UE RI (and corresponding CQI and PMI) to the eNB at X2 1038.

Figure 13:
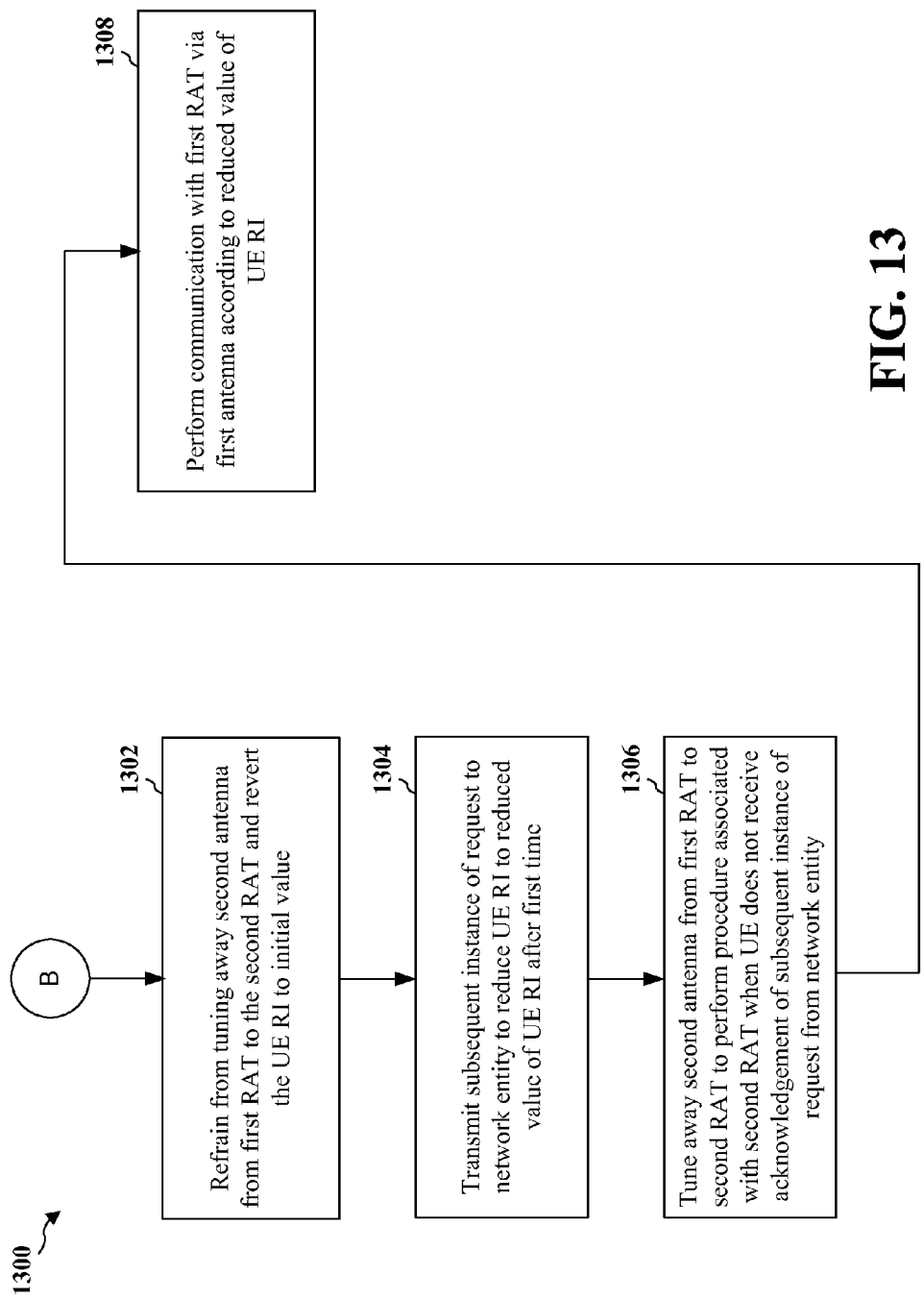
FIG. 13 is a flow chart of a method of wireless communication continuing from FIG. 11.

FIG. 13 is a flow chart 1300 of a method of wireless communication continuing from FIG. 11. In particular, the flow chart 1300 continues from the flow chart 1100 of FIG. 11 if the UE does not receive the acknowledgement in response to the transmission of the request to reduce the UE RI. At step 1302, the UE refrains from the tuning away the second antenna from the first RAT to the second RAT and reverts the UE RI to the initial value. In an aspect, the refraining from tuning away may be performed by at least one of antenna determination module 1404, first RAT processing module 1406, second RAT processing module 1410, processor 1504, etc. As discussed supra, if the UE 710 does not receive any acknowledgement of the reduction request, the UE 710 may skip the tune away, and may revert the UE RI back to the initial UE RI value. As discussed supra, without the acknowledgment of the reduction request, the UE 710 and the LTE network 732 communicate with each other based on the initial value of the UE RI, and using both the primary antenna 712 and the secondary antenna 714.

At step 1304, the UE transmits a subsequent instance of the request to the network entity to reduce the UE RI to the reduced value of the UE RI after the first time when the UE does not receive the acknowledgement. In an aspect, the transmission may be performed by at least one of transmission module 1408, processor 1504, etc. The subsequent instance of the request may be transmitted to the network entity at an earlier subframe than a subframe at which the request before the subsequent instance of the request is transmitted to the network. At step 1306, the UE tunes away the second antenna from the first RAT to the second RAT to perform the procedure associated with the second RAT when the UE does not receive an acknowledgement of the subsequent instance of the request from the network entity. In an aspect, the tune away may be performed by at least one of the antenna determination module 1404, second RAT processing module 1410, transmission module 1408, processor 1504, etc. At step 1308, the UE performs communication with the first RAT via the first antenna according to the reduced value of the UE RI. In an aspect, the communications may be performed by at least one of first RAT processing module 1406, reception module 1412, transmission module 1408, processor 1504, etc. As discussed supra, if the first tune away period is skipped, the UE 710 may again transmit a reduction request to the eNB before the next tune away period in order to propose a reduced UE RI. As discussed supra, the reduction request for the next tune away period may be transmitted at an earlier subframe (e.g., [n−(2*kPHICH)]$^{th}$ subframe) than a subframe (e.g., [n−kPHICH]$^{th}$ subframe) at which the reduction request is previously transmitted. If the UE 710 receives the acknowledgement of the reduction request, then the UE 710 can relieve the Rx chain for the secondary antenna 714 from the LTE network 732, such that the relieved Rx chain may be utilized for a non-LTE RAT. If the UE 710 does not receive any acknowledgement of the reduction request for the next tune away and thus fails to receive any acknowledgement for the second time, the UE 710 may perform the tune away, regardless of whether the UE 710 has received the acknowledgement or not. Further, as discussed supra, during the next tune away, the UE 710 performs communication with the LTE network 732 using the primary antenna 712 and without using the secondary antenna 714.

Figure 14:
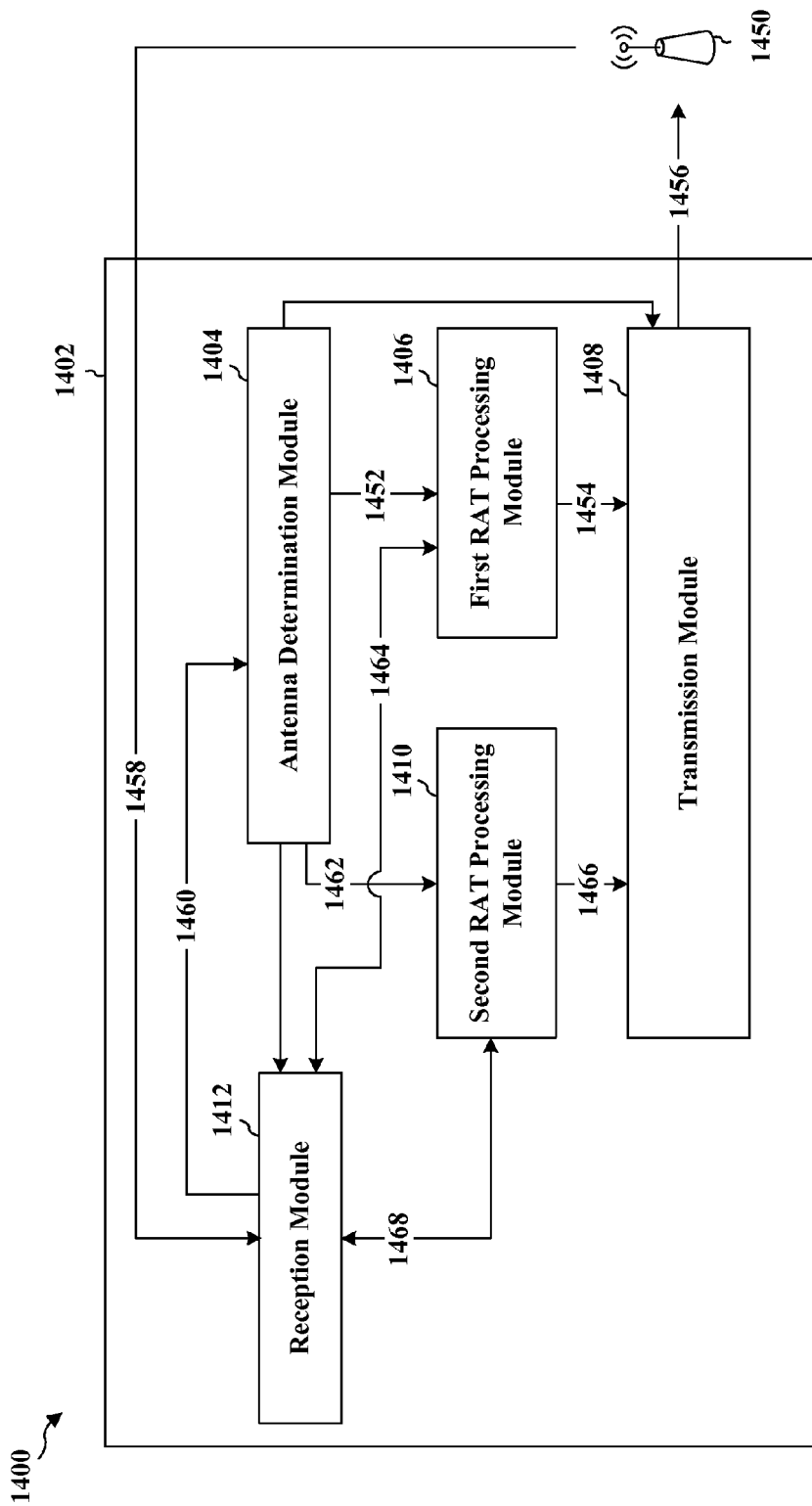
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The UE may use a first antenna and a second antenna for communication with a first RAT. The apparatus includes an antenna determination module 1404, a first RAT processing module 1406, a transmission module 1408, a second RAT processing module 1410, and a reception module 1412. The antenna determination module 1404 determines that the second antenna is to be used for a procedure associated with a second RAT at a first time. The first RAT processing module 1406 reduces a UE RI from an initial value to a reduced value for the communication with the first RAT at the first time based on the determination communicated via 1452. The first RAT processing module 1406 at 1454 transmits via the transmission module 1408 at 1456 a request to a network entity (e.g., an eNB 1450) to reduce the UE RI to the reduced value before the first time. The first RAT processing module 1406 may transmit the request to the network entity 1450 before the first time when the procedure associated with the second RAT begins before a start of a sleep time associated with the first RAT and overlaps at least in part with the sleep time associated with the first RAT. Alternatively, the first RAT processing module 1406 may transmit the request to the network entity 1450 before a start of a sleep time associated with the first RAT when the procedure associated with the second RAT begins after the start of the sleep time associated with the first RAT and overlaps at least in part with the sleep time associated with the first RAT.

The reception module 1412 may receive at 1458 an acknowledgement in response to the transmission of the request to reduce the UE RI, and may communicate at 1460 the acknowledgement to the antenna determination module 1404. When the reception module 1412 receives at 1458 an acknowledgement in response to the transmission, the antenna determination module 1404 at 1462 tunes away the second antenna from the first RAT to the second RAT to perform the procedure associated with the second RAT. In an aspect, the procedure may be implemented by the second RAT processing module 1410 through the transmission module 1408 at 1466 and 1456 and the reception module 1412 at 1458 and 1468. The first RAT processing module 1406 performs, via the transmission module 1408 at 1456 and the reception module 1412 at 1458, communication with the first RAT via the first antenna according to the reduced value of the UE RI. The first RAT processing module 1406 at 1454 transmits via the transmission module 1408 at 1456 a request to the network entity 1450 to return to the initial value of the UE RI after the procedure associated with the second RAT is performed. The first RAT processing module 1406 at 1454 and 1464 performs, via the transmission module 1408 at 1456 and the reception module 1412 at 1458, communication with the first RAT via the first antenna and the second antenna according to the initial value of the UE RI when the apparatus receives an acknowledgement from the network entity 1450 in response to the transmission of the request to return to the initial value of the UE RI. The first RAT processing module 1406 may transmit the request to the network entity 1450 to return to the initial value of the UE RI at a later one of a time at which a sleep time associated with the first RAT ends and a time at which performance of the procedure associated with the second RAT ends.

The antenna determination module 1404 refrains from tuning away the second antenna from the first RAT to the second RAT and reverts the UE RI to the initial value when the apparatus does not receive the acknowledgement from the network entity 1450. The first RAT processing module 1406 transmits at 1454 via the transmission module 1408 at 1456 a subsequent instance of the request to the network entity 1450 to reduce the UE RI to the reduced value of the UE RI after the first time when the UE does not receive the acknowledgement. The subsequent instance of the request may be transmitted to the network entity 1450 at an earlier subframe than a subframe at which the request before the subsequent instance of the request is transmitted to the network. The antenna determination module 1404 tunes away at 1462 the second antenna from the first RAT to the second RAT to perform the procedure associated with the second RAT via the second RAT processing module 1410 through the transmission module 1408 at 1466 and 1456 and the reception module 1412 at 1458 and 1468 when the reception module 1412 does not receive an acknowledgement of the subsequent instance of the request from the network entity 1450. The first RAT processing module 1406 performs at 1454 and 1464, via the transmission module 1408 at 1456 and the reception module 1412 at 1458, communication with the first RAT via the first antenna according to the reduced value of the UE RI. The first RAT processing module 1406 updates at least one of a channel quality indicator (CQI) or a pre-coding matrix indicator (PMI) based on the reduced value of the UE RI.

The apparatus may include additional modules that perform each of the steps of the algorithm in the aforementioned flow charts of FIGS. 11-13. As such, each step in the aforementioned flow charts of FIGS. 11-13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
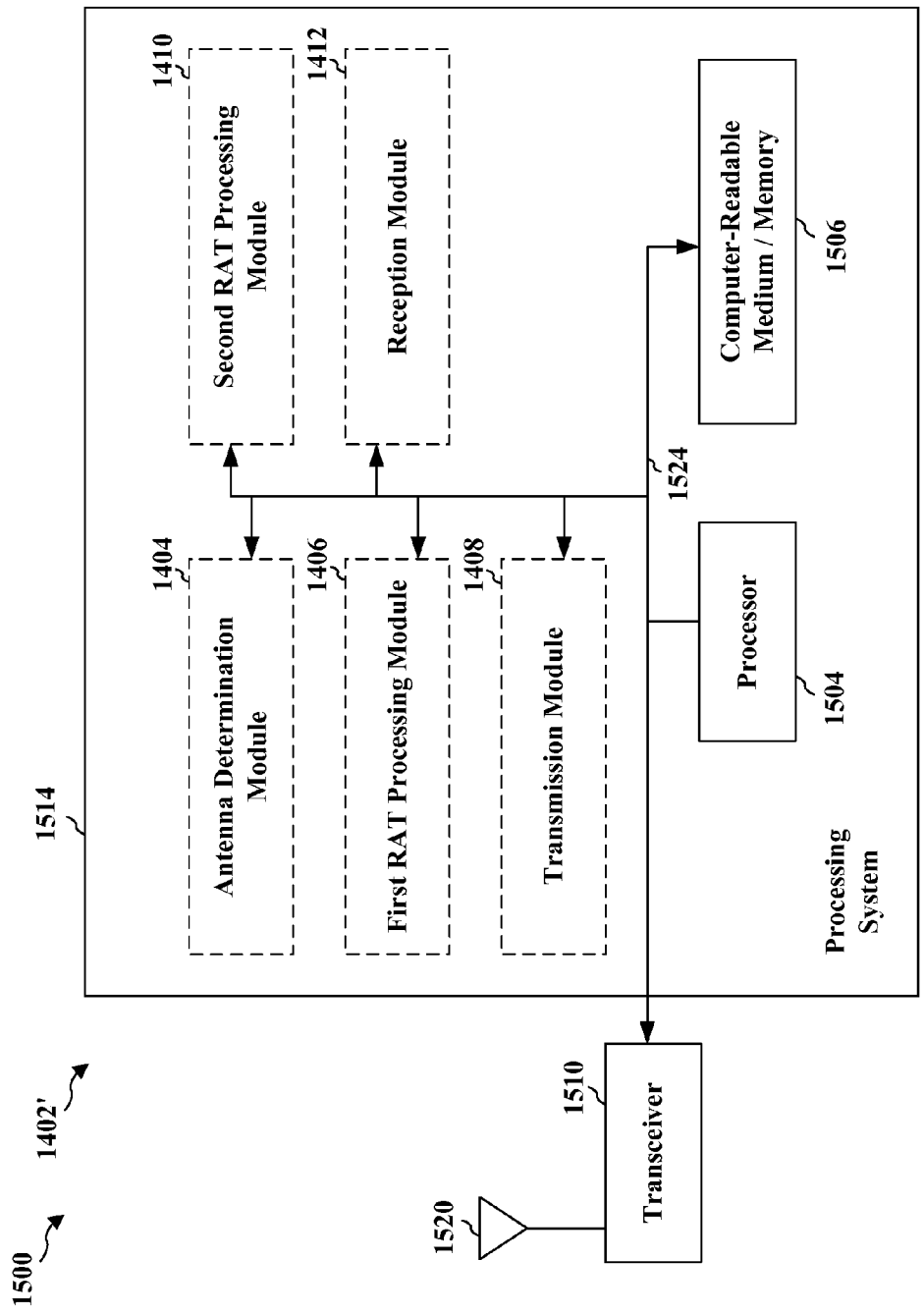
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception module 1412. In addition, the transceiver 1510 receives information from the processing system 1514, specifically the transmission module 1408, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium/ memory 1506, one or more hardware modules coupled to the processor 1504, or some combination thereof. The processing system 1514 may be a component of the UE 650 and may include the memory 660 and/or at least one of the TX processor 668, the RX processor 656, and the controller/ processor 659.

In one configuration, the apparatus 1402/1402' for wireless communication is a UE which uses a first antenna and a second antenna for communication with a first RAT, and includes means for determining that the second antenna is to be used for a procedure associated with a second RAT at a first time and means for reducing a UE RI from an initial value to a reduced value for the communication with the first RAT at the first time based on the determination. The apparatus 1402/1402' also includes means for transmitting a request to a network entity to reduce the UE RI to the reduced value before the first time, means for tuning away the second antenna from the first RAT to the second RAT to perform the procedure associated with the second RAT when the UE receives an acknowledgement in response to the transmission, and means for performing communication with the first RAT via the first antenna according to the reduced value of the UE RI when the UE receives the acknowledgement in response to the transmission. The means for transmitting the request to the network entity to reduce the UE RI may include means for transmitting the request to the network entity before the first time when the procedure associated with the second RAT begins before a start of a sleep time associated with the first RAT and overlaps at least in part with the sleep time associated with the first RAT or means for transmitting the request to the network entity before the start of the sleep time associated with the first RAT when the procedure associated with the second RAT begins after the start of the sleep time associated with the first RAT and overlaps at least in part with the sleep time associated with the first RAT. The apparatus 1402/1402' may also include means for transmitting a request to return to the initial value of the UE RI to the network entity at a later one of a time at which the sleep time associated with the first RAT ends and a time at which performance of the procedure associated with the second RAT ends. The apparatus 1402/1402' further includes means for transmitting a request to the network entity to return to the initial value of the UE RI after the procedure associated with the second RAT is performed, and means for performing communication with the first RAT via the first antenna and the second antenna according to the initial value of the UE RI when the UE receives an acknowledgement from the network entity in response to the transmission of the request to return to the initial value of the UE RI. The apparatus 1402/1402' further includes means for updating at least one of a CQI or a PMI based on the reduced value of the UE RI.

The apparatus 1402/1402' also includes means for refraining from the tuning away the second antenna from the first RAT to the second RAT and reverting the UE RI to the initial value when the UE does not receive the acknowledgement from the network entity. The apparatus 1402/1402' further includes means for transmitting a subsequent instance of the request to the network entity to reduce the UE RI to the reduced value of the UE RI after the first time when the UE does not receive the acknowledgement, means for tuning away the second antenna from the first RAT to the second RAT to perform the procedure associated with the second RAT when the UE does not receive an acknowledgement of the subsequent instance of the request from the network entity, and means for performing communication with the first RAT via the first antenna according to the reduced value of the UE RI. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/ processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining, by a user equipment (UE) using a first antenna and a second antenna for communication via a first radio access technology (RAT), that the second antenna is to be used for a procedure associated with a second RAT at a first time;
   reducing, by the UE and before the first time, a UE rank index (RI) from an initial value to a reduced value for the communication with the first RAT at the first time based on the determination that the second antenna is to be used for the procedure associated with the second RAT at the first time; and updating, upon reducing the UE RI from the initial value to the reduced value, by the UE and before the first time, at least one of a channel quality indicator (CQI) or a pre-coding matrix indicator (PMI) based on the reduced value of the UE RI.

2. The method of claim 1, wherein the second antenna is unavailable for communication with the first RAT while the second antenna is used for the procedure associated with the second RAT.

3. The method of claim 1, further comprising:
transmitting a request to a network entity to reduce the UE RI to the reduced value before the first time;
tuning away the second antenna from the first RAT to the second RAT to perform the procedure associated with the second RAT when the UE receives an acknowledgement in response to the transmission; and
performing communication with the first RAT via the first antenna according to the reduced value of the UE RI when the UE receives the acknowledgement in response to the transmission.

4. The method of claim 3, further comprising:
refraining from the tuning away the second antenna from the first RAT to the second RAT and reverting the UE RI to the initial value when the UE does not receive the acknowledgement from the network entity.

5. The method of claim 4, further comprising:
transmitting a subsequent instance of the request to the network entity to reduce the UE RI to the reduced value of the UE RI after the first time when the UE does not receive the acknowledgement;
tuning away the second antenna from the first RAT to the second RAT to perform the procedure associated with the second RAT when the UE does not receive an acknowledgement of the subsequent instance of the request from the network entity; and
performing communication with the first RAT via the first antenna according to the reduced value of the UE RI.

6. The method of claim 5, wherein the subsequent instance of the request is transmitted to the network entity at an earlier subframe than a subframe at which the request before the subsequent instance of the request is transmitted to the network.

7. The method of claim 3, further comprising:
transmitting a request to the network entity to return to the initial value of the UE RI after the procedure associated with the second RAT is performed; and
performing communication with the first RAT via the first antenna and the second antenna according to the initial value of the UE RI when the UE receives an acknowledgement from the network entity in response to the transmission of the request to return to the initial value of the UE RI.

8. The method of claim 7, wherein the transmitting the request to the network entity to return to the initial value comprises:
transmitting the request to the network entity to return to the initial value of the UE RI at a later one of a time at which a sleep time associated with the first RAT ends and a time at which performance of the procedure associated with the second RAT ends.

9. The method of claim 3, wherein the transmitting comprises:
transmitting the request to the network entity before the first time when the procedure associated with the second RAT begins before a start of a sleep time associated with the first RAT and overlaps at least in part with the sleep time associated with the first RAT; or
transmitting the request to the network entity before a start of a sleep time associated with the first RAT when the procedure associated with the second RAT begins after the start of the sleep time associated with the first RAT and overlaps at least in part with the sleep time associated with the first RAT.

10. The method of claim 3, wherein transmitting the request to the network entity to reduce the UE RI to the reduced value includes transmitting the request to the network entity via at least one of a Physical Uplink Shared Channel (PUSCH) or a Physical Uplink Control Channel (PUCCH).

11. The method of claim 3, further comprising determining, by the UE, whether the acknowledgement is received in response to transmitting the request to the network entity to reduce the UE RI to the reduced value.

12. An apparatus for wireless communication, wherein the apparatus is a user equipment (UE) using a first antenna and a second antenna for communication via a first radio access technology (RAT), the apparatus comprising:
a memory; and
at least one processor coupled to the memory and configured to:
determine that the second antenna is to be used for a procedure associated with a second RAT at a first time;
reduce, before the first time, a UE rank index (RI) from an initial value to a reduced value for the communication with the first RAT at the first time based on the determination that the second antenna is to be used for the procedure associated with the second RAT at the first time; and
update, upon reducing the UE RI from the initial value to the reduced value, before the first time, at least one of a channel quality indicator (CQI) or a pre-coding matrix indicator (PMI) based on the reduced value of the UE RI.

13. The apparatus of claim 12, wherein the second antenna is unavailable for communication with the first RAT while the second antenna is used for the procedure associated with the second RAT.

14. The apparatus of claim 12, wherein the at least one processor is further configured to:
transmit a request to a network entity to reduce the UE RI to the reduced value before the first time;
tune away the second antenna from the first RAT to the second RAT to perform the procedure associated with the second RAT when the UE receives an acknowledgement in response to the transmission; and
perform communication with the first RAT via the first antenna according to the reduced value of the UE RI when the UE receives the acknowledgement in response to the transmission.

15. The apparatus of claim 14, wherein the at least one processor is further configured to:
refrain from the tuning away the second antenna from the first RAT to the second RAT and reverting the UE RI to the initial value when the UE does not receive the acknowledgement from the network entity.

16. The apparatus of claim 15, wherein the at least one processor is further configured to:
transmit a subsequent instance of the request to the network entity to reduce the UE RI to the reduced value of the UE RI after the first time when the UE does not receive the acknowledgement;

tune away the second antenna from the first RAT to the second RAT to perform the procedure associated with the second RAT when the UE does not receive an acknowledgement of the subsequent instance of the request from the network entity; and perform communication with the first RAT via the first antenna according to the reduced value of the UE RI.

17. The apparatus of claim 16, wherein the subsequent instance of the request is transmitted to the network entity at an earlier subframe than a subframe at which the request before the subsequent instance of the request is transmitted to the network.

18. The apparatus of claim 14, wherein the at least one processor is further configured to:

transmit a request to the network entity to return to the initial value of the UE RI after the procedure associated with the second RAT is performed; and perform communication with the first RAT via the first antenna and the second antenna according to the initial value of the UE RI when the UE receives an acknowledgement from the network entity in response to the transmission of the request to return to the initial value of the UE RI.

19. The apparatus of claim 18, wherein the at least one processor configured to transmit the request to the network entity to return to the initial value is further configured to:

transmit a request to return to the initial value of the UE RI to the network entity at a later one of a time at which the sleep time associated with the first RAT ends and a time at which performance of the procedure associated with the second RAT ends.

20. The apparatus of claim 14, wherein the at least one processor configured to transmit the request to the network entity is further configured to:

transmit the request to the network entity before the first time when the procedure associated with the second RAT begins before a start of a sleep time associated with the first RAT and overlaps at least in part with the sleep time associated with the first RAT; or transmit the request to the network entity before the start of the sleep time associated with the first RAT when the procedure associated with the second RAT begins after the start of the sleep time associated with the first RAT and overlaps at least in part with the sleep time associated with the first RAT.

21. An apparatus for wireless communication, wherein the apparatus is a user equipment (UE) using a first antenna and a second antenna for communication via a first radio access technology (RAT), the apparatus comprising:

means for determining that the second antenna is to be used for a procedure associated with a second RAT at a first time;

means for reducing, before the first time, a UE rank index (RI) from an initial value to a reduced value for the communication with the first RAT at the first time based on the determination that the second antenna is to be used for the procedure associated with the second RAT at the first time; and means for updating, upon reducing the UE RI from the initial value to the reduced value, before the first time, at least one of a channel quality indicator (CQI) or a pre-coding matrix indicator (PMI) based on the reduced value of the UE RI.

22. The apparatus of claim 21, wherein the second antenna is unavailable for communication with the first RAT while the second antenna is used for the procedure associated with the second RAT.

23. The apparatus of claim 21, further comprising:

means for transmitting a request to a network entity to reduce the UE RI to the reduced value before the first time;

means for tuning away the second antenna from the first RAT to the second RAT to perform the procedure associated with the second RAT when the UE receives an acknowledgement in response to the transmission; and means for performing communication with the first RAT via the first antenna according to the reduced value of the UE RI when the UE receives the acknowledgement in response to the transmission.

24. The apparatus of claim 23, further comprising:

means for refraining from the tuning away the second antenna from the first RAT to the second RAT and reverting the UE RI to the initial value when the UE does not receive the acknowledgement from the network entity.

25. The apparatus of claim 23, further comprising:

means for transmitting a request to the network entity to return to the initial value of the UE RI after the procedure associated with the second RAT is performed; and means for performing communication with the first RAT via the first antenna and the second antenna according to the initial value of the UE RI when the UE receives an acknowledgement from the network entity in response to the transmission of the request to return to the initial value of the UE RI.

26. The apparatus of claim 25, wherein the means for transmitting the request to the network entity to return to the initial value is configured to:

transmit the request to the network entity to return to the initial value of the UE RI at a later one of a time at which a sleep time associated with the first RAT ends and a time at which performance of the procedure associated with the second RAT ends.

27. The apparatus of claim 23, further comprising:

means for transmitting a subsequent instance of the request to the network entity to reduce the UE RI to the reduced value of the UE RI after the first time when the UE does not receive the acknowledgement;

means for tuning away the second antenna from the first RAT to the second RAT to perform the procedure associated with the second RAT when the UE does not receive an acknowledgement of the subsequent instance of the request from the network entity; and means for performing communication with the first RAT via the first antenna according to the reduced value of the UE RI.

28. The apparatus of claim 23, wherein the means for transmitting is configured to:

transmit the request to the network entity before the first time when the procedure associated with the second RAT begins before a start of a sleep time associated with the first RAT and overlaps at least in part with the sleep time associated with the first RAT; or transmit the request to the network entity before the start of the sleep time associated with the first RAT when the procedure associated with the second RAT begins after the start of the sleep time associated with the first RAT and overlaps at least in part with the sleep time associated with the first RAT.

29. A non-transitory computer-readable medium storing computer executable code for a user equipment (UE) using a first antenna and a second antenna for communication via a first radio access technology (RAT), comprising code for:
determining that the second antenna is to be used for a procedure associated with a second RAT at a first time;
reducing, before the first time, a UE rank index (RI) from an initial value to a reduced value for the communication with the first RAT at the first time based on the determination that the second antenna is to be used for the procedure associated with the second RAT at the first time; and
updating, upon reducing the UE RI from the initial value to the reduced value, before the first time, at least one of a channel quality indicator (CQI) or a pre-coding matrix indicator (PMI) based on the reduced value of the UE RI.

* * * * *